United States Patent
Kim et al.

(10) Patent No.: US 12,177,915 B2
(45) Date of Patent: Dec. 24, 2024

(54) METHOD AND DEVICE FOR PERFORMING UL TRANSMISSION THROUGH MULTI-LINK IN WIRELESS LAN SYSTEM

(71) Applicant: LG ELECTRONICS INC., Seoul (KR)

(72) Inventors: Jeongki Kim, Seoul (KR); Kiseon Ryu, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 483 days.

(21) Appl. No.: 17/606,708

(22) PCT Filed: May 4, 2020

(86) PCT No.: PCT/KR2020/005847
§ 371 (c)(1),
(2) Date: Oct. 26, 2021

(87) PCT Pub. No.: WO2020/222597
PCT Pub. Date: Nov. 5, 2020

(65) Prior Publication Data
US 2022/0217797 A1 Jul. 7, 2022

Related U.S. Application Data

(60) Provisional application No. 62/841,204, filed on Apr. 30, 2019.

(51) Int. Cl.
*H04W 76/15* (2018.01)
*H04W 28/02* (2009.01)
(Continued)

(52) U.S. Cl.
CPC ....... *H04W 76/15* (2018.02); *H04W 28/0268* (2013.01); *H04W 74/0808* (2013.01); *H04W 84/12* (2013.01)

(58) Field of Classification Search
CPC ............. H04W 76/15; H04W 28/0268; H04W 74/0808; H04W 84/12; H04W 24/10
See application file for complete search history.

(56) References Cited

U.S. PATENT DOCUMENTS

2016/0014725 A1* 1/2016 Yu .................... H04W 72/0453
370/329
2017/0187437 A1* 6/2017 Cariou ................. H04B 7/0417
(Continued)

FOREIGN PATENT DOCUMENTS

KR 1020130057638 6/2013
WO 2015002466 1/2015
(Continued)

OTHER PUBLICATIONS

Li et al., "Channel Access Method in Contention Period, Related Device, and System", Nov. 1, 2018, WO, English translation of WO 2018195903. (Year: 2018).*

*Primary Examiner* — Michael K Phillips
(74) *Attorney, Agent, or Firm* — BRYAN CAVE LEIGHTON PAISNER LLP

(57) ABSTRACT

Proposed are a method and device for performing UL transmission through a multi-link in a wireless LAN system. In detail, a transmission STA generates a first frame including BQR information regarding the multi-link. The transmission STA transmits the first frame to a reception STA. The multi-link is a link in which first and second links are combined with each other. The BQR information regarding the multi-link includes channel state information regarding at least one of the first and second links. The first frame is transmitted through the second link.

11 Claims, 29 Drawing Sheets

(51) Int. Cl.
*H04W 74/0808* (2024.01)
*H04W 84/12* (2009.01)

(56) References Cited

U.S. PATENT DOCUMENTS

| | | | |
|---|---|---|---|
| 2018/0132228 A1 | 5/2018 | Lan et al. | |
| 2018/0310133 A1* | 10/2018 | Ramasamy | G01S 5/0242 |
| 2018/0310310 A1 | 10/2018 | Huang et al. | |
| 2019/0150214 A1* | 5/2019 | Zhou | H04W 76/15 |
| | | | 370/329 |
| 2020/0014576 A1* | 1/2020 | Cherian | H04W 72/0453 |
| 2020/0015219 A1* | 1/2020 | Asterjadhi | H04W 72/51 |
| 2020/0214036 A1* | 7/2020 | Min | H04W 28/0278 |

FOREIGN PATENT DOCUMENTS

| | | |
|---|---|---|
| WO | 2017191903 | 11/2017 |
| WO | WO-2018195903 A1 * | 11/2018 |

\* cited by examiner

FIG. 1
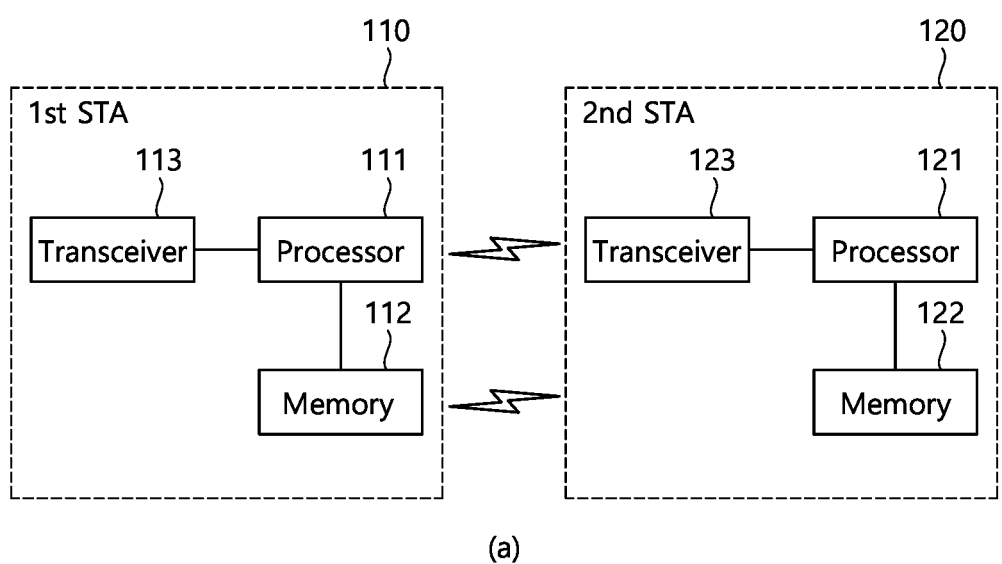
(a)
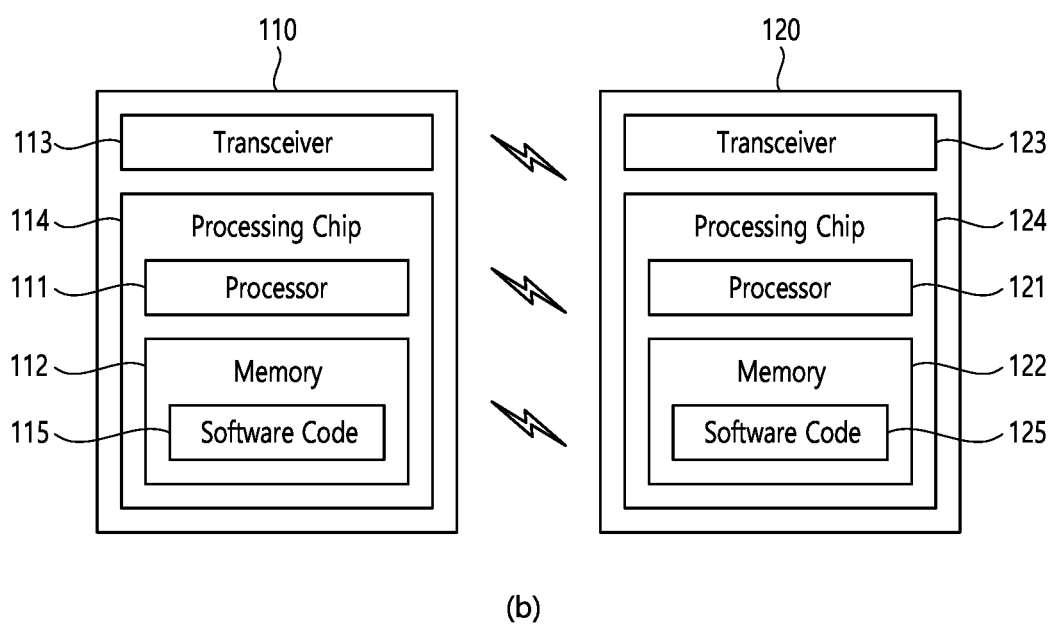
(b)

FIG. 2
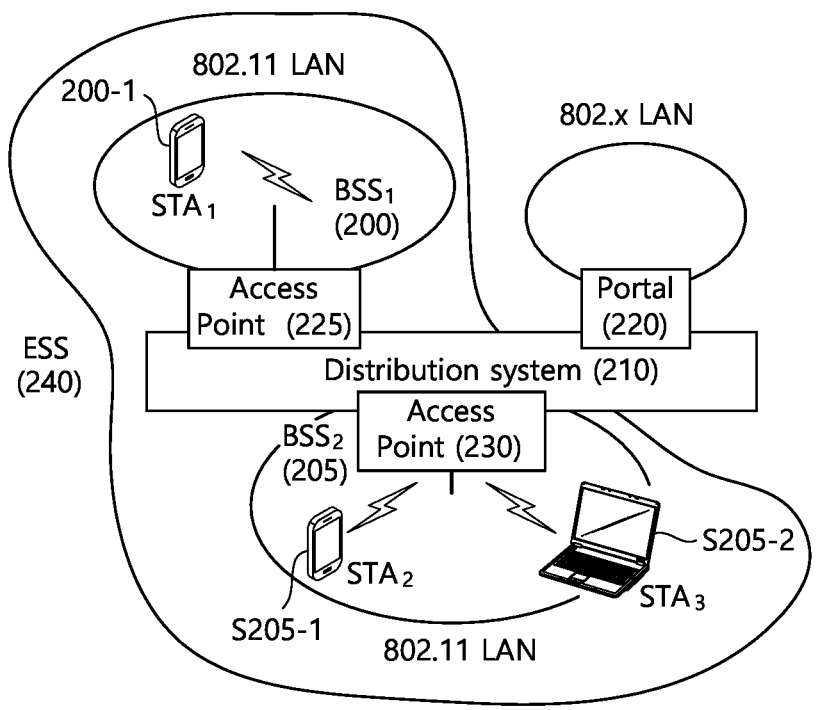
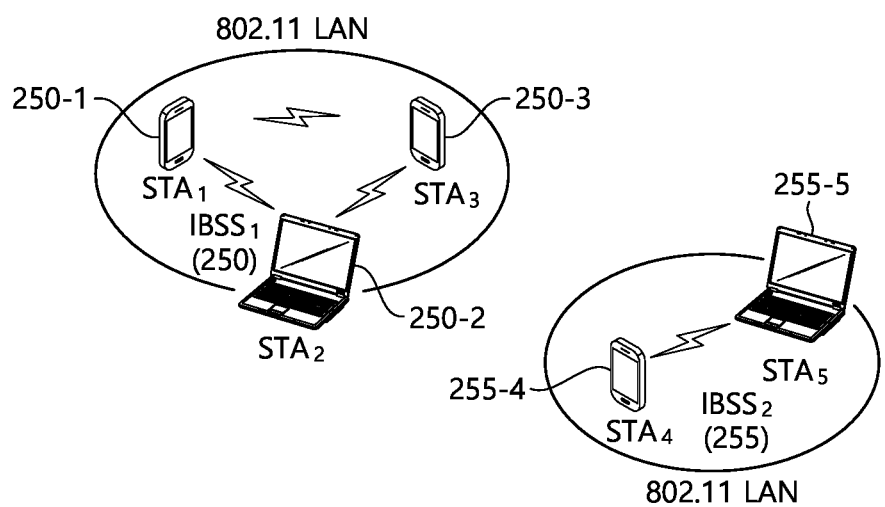

FIG. 22

| Bit#0 | Bit#1 | Bit#2 | Bit#3~7 |
|---|---|---|---|
| Band 1 (e.g., 2.4GHz) | Band 2 (e.g., 5GHz) | Band 3 (e.g., 6GHz) | Reserved |

Bits :  1   1   1   5

FIG. 23

| Bit#0 | Bit#1 | Bit#2 | Bit#3 | Bit#4 | Bit#5~7 |
|---|---|---|---|---|---|
| Band 1 (e.g., 2.4GHz) | Band 2 (e.g., Subband 1 in 5GHz) | Band 3 (e.g., Subband 2 in 5GHz) | Band 4 (e.g., Subband 1 in 6GHz) | Band 5 (e.g., Subband 2 in 6GHz) | Reserved |
| 1 | 1 | 1 | 1 | 1 | 3 |

Bits :

FIG. 24

| Band Information (band 1, 2, ..., N) | Available Channel bitmap for band 1 | Available Channel bitmap for band 2 | ... | Available Channel bitmap for band N |
|---|---|---|---|---|

METHOD AND DEVICE FOR PERFORMING UL TRANSMISSION THROUGH MULTI-LINK IN WIRELESS LAN SYSTEM

This application is the National Stage filing under 35 U.S.C. 371 of International Application No. PCT/KR2020/005847 filed on May 4, 2020, which claims priority to U.S. Provisional Application No. 62/841,204 filed on Apr. 30, 2019, the contents of which are all hereby incorporated by reference herein in their entirety.

BACKGROUND OF THE DISCLOSURE

Field of the Disclosure

The present specification relates to a method for configuring multi-link in a WLAN system and, most particularly, to a method and device for performing UL transmission through a multi-link.

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to appropriately use the increased number of spatial streams, a signaling method within the WLAN system may need to be increased.

SUMMARY OF THE DISCLOSURE

Technical Objects

The present specification proposes a method and device for performing UL transmission through a multi-link in a WLAN system.

Technical Solutions

An example of the present specification proposes a method for performing UL transmission through a multi-link.

The present embodiment may be performed in a network environment in which a next generation WLAN system is being supported. The next generation wireless LAN system is a WLAN system that is enhanced from an 802.11ax system and may, therefore, satisfy backward compatibility with the 802.11ax system.

The next generation WLAN system may support Flexible DL/UL (FDU) technology. The FDU technology is a technology that enables a user equipment (UE) having two or more RFs to independently transmit/receive data in each RF. Since data being transmitted through a specific RF does not influence data being transmitted from another RF, the application of the FDU is advantageous in that a channel may be efficiently used.

The present embodiment is a method for performing UL transmission through a multi-link adopting the FDU technology. And, most particularly, the present embodiment proposes a method for efficiently performing UL MU transmission by transmitting BQR information.

The present embodiment is performed by a transmitting station (STA), and the transmitting STA may correspond to an STA supporting an Extremely High Throughput (EHT) system. A receiving STA of the present embodiment may correspond to an access point (AP).

The transmitting STA generates a first frame including Bandwidth Query Report (BQR) information for a multi-link.

The transmitting STA transmits the first frame to a receiving STA.

The multi-link is a link having first and second links combined therein.

The BQR information for the multi-link includes channel status information of at least one of the first link and the second link. And, the first frame is transmitted through the second link.

That is, the BQR information for the multi-link may not only include channel status information for the second link through which the first frame is being transmitted but may also include channel status information for the first link (another link). Furthermore, the BQR information for the multi-link may only include the BQR information (channel status information) for the first link (another link), without the BQR information (channel status information) for the second link through which the first frame is being transmitted.

Effects of the Disclosure

According to the embodiment proposed in the present specification, by efficiently transmitting BQR information, by a UE performing a multi-link operation, resource conflict that may occur when UL resource is allocated to a busy channel or when a BQRP trigger frame fails to be received, may be prevented. Thus, waste of resources may be prevented.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 22 is an example representing a Band Information subfield in a bitmap format.

FIG. 23 is another example representing a Band Information subfield in a bitmap format.

FIG. 24 shows an example of a HE variant Multiband BQR Control field that includes Multiband BQR information.

Figure 3:
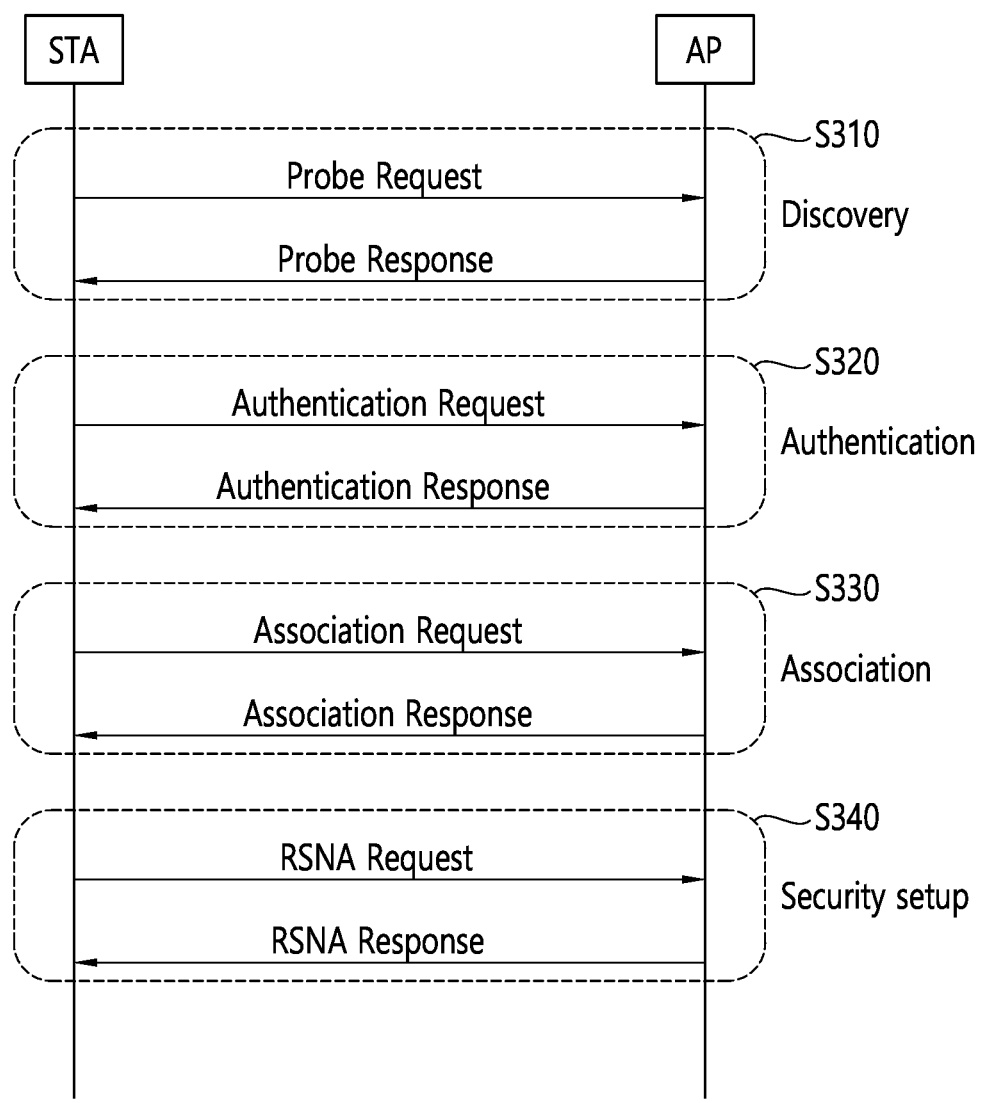
FIG. 3 illustrates a general link setup process.

DESCRIPTION OF EXEMPLARY
EMBODIMENTS

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may also be indicated as an AP STA.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e.EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e., IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
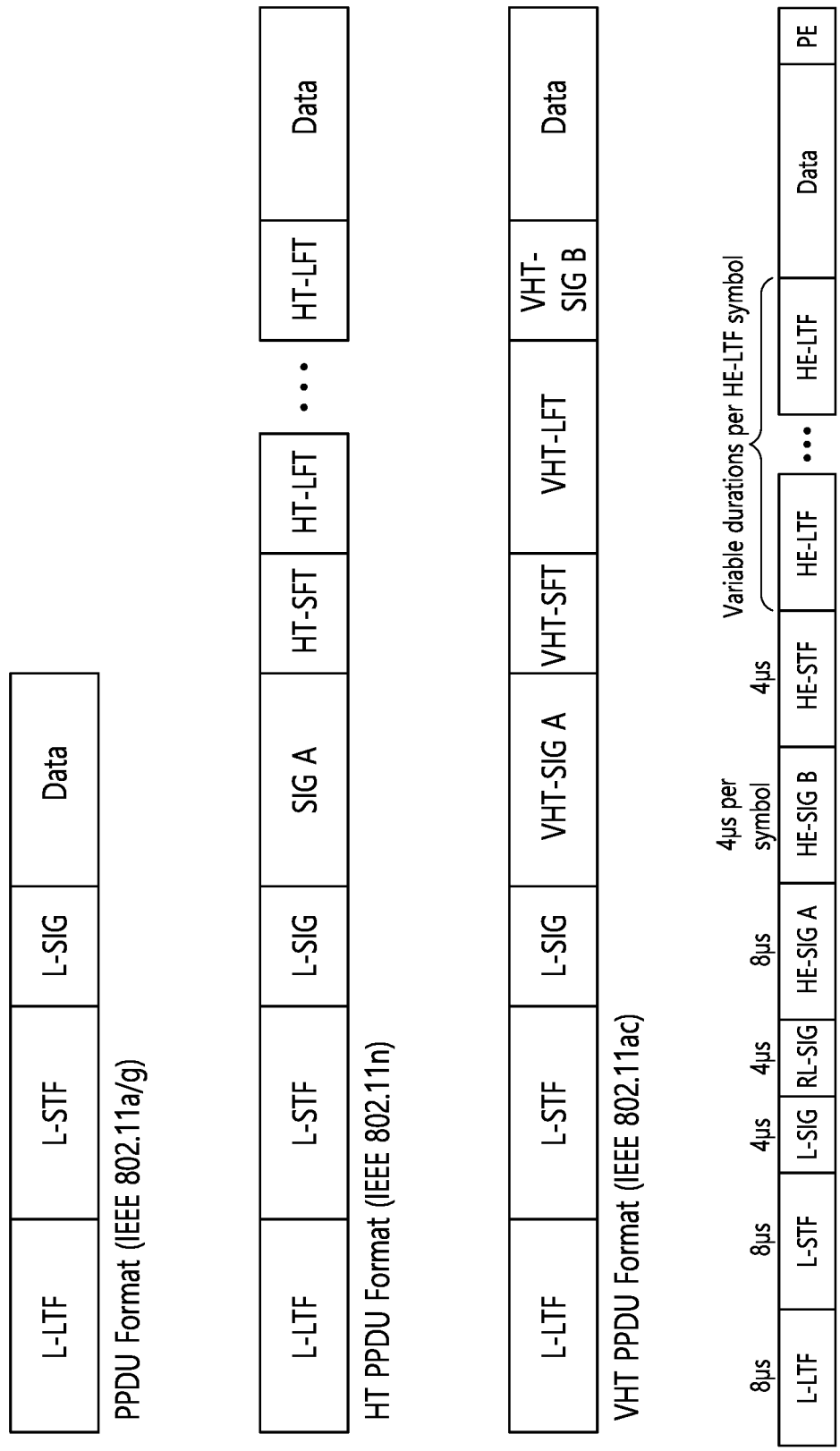
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
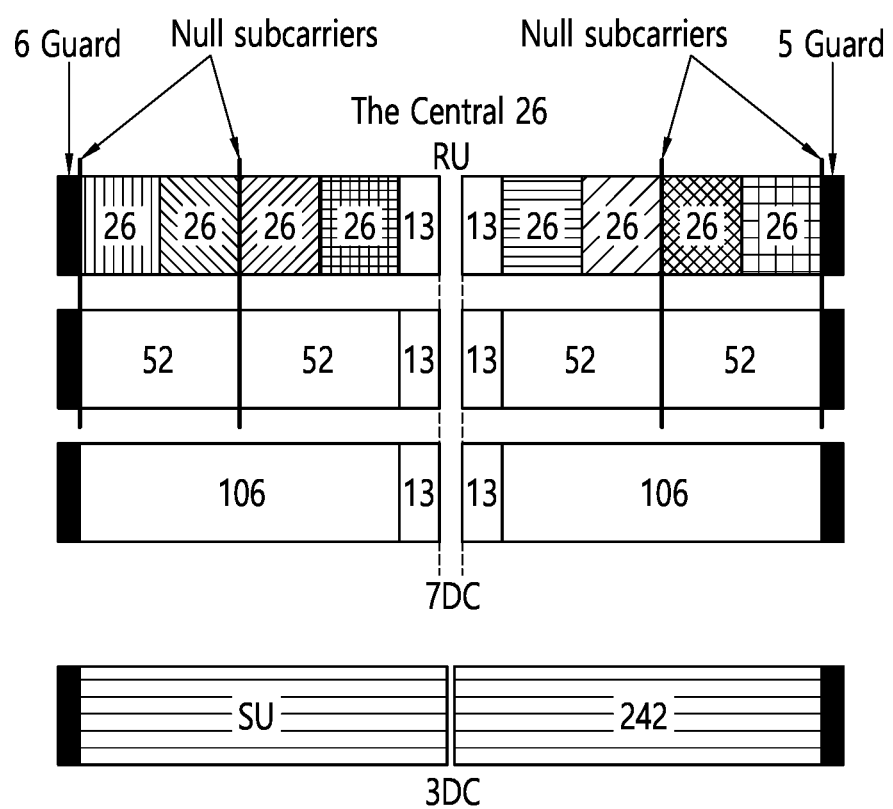
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
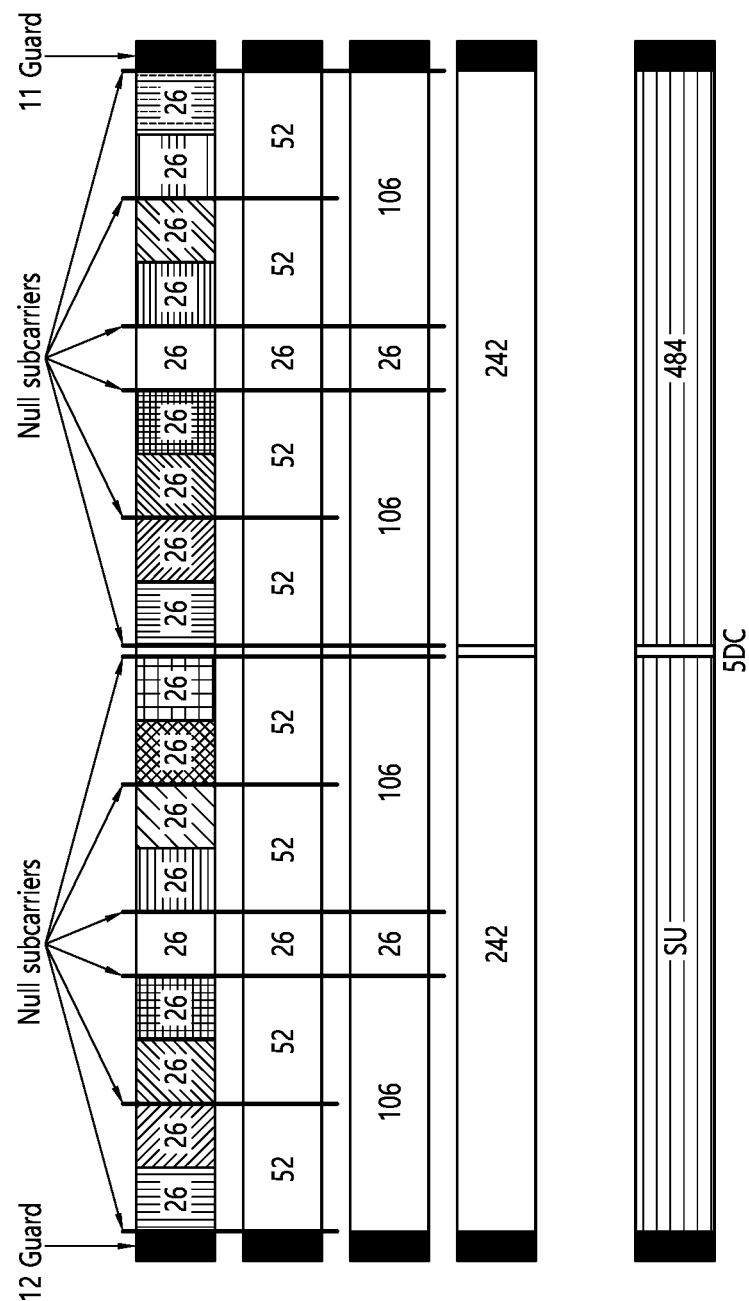
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
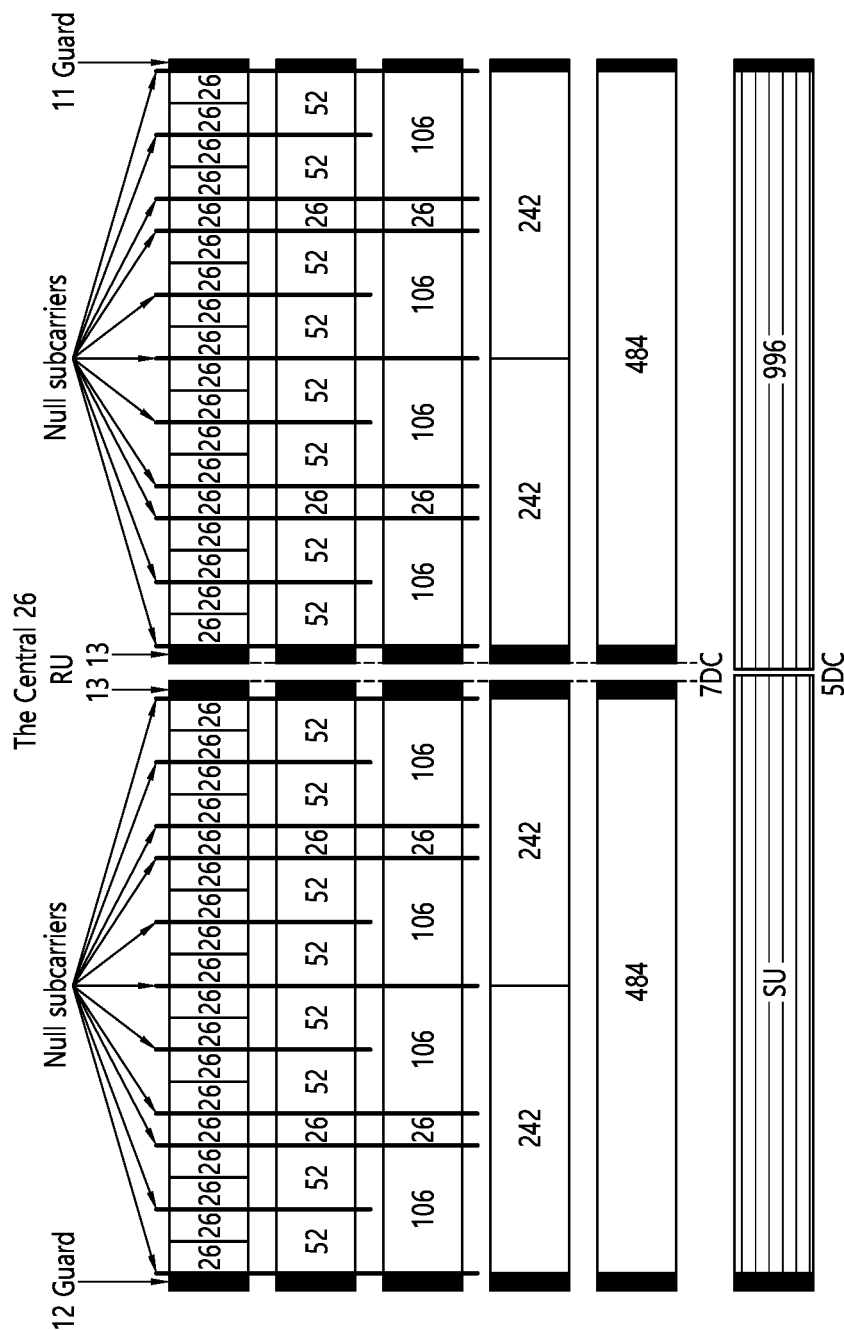
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g., EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
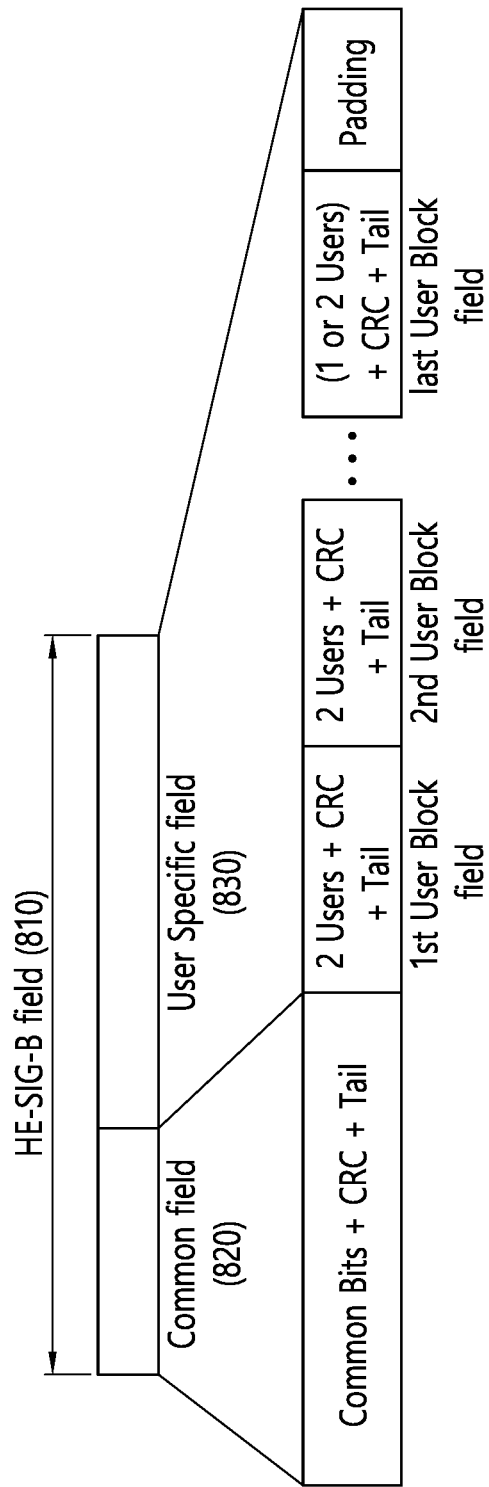
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | 26 | 26 | 26 | 26 | 26 | | 8 |
| 01001$y_2y_1y_0$ | | 106 | | 26 | 26 | 26 | 52 | | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

Figure 9:
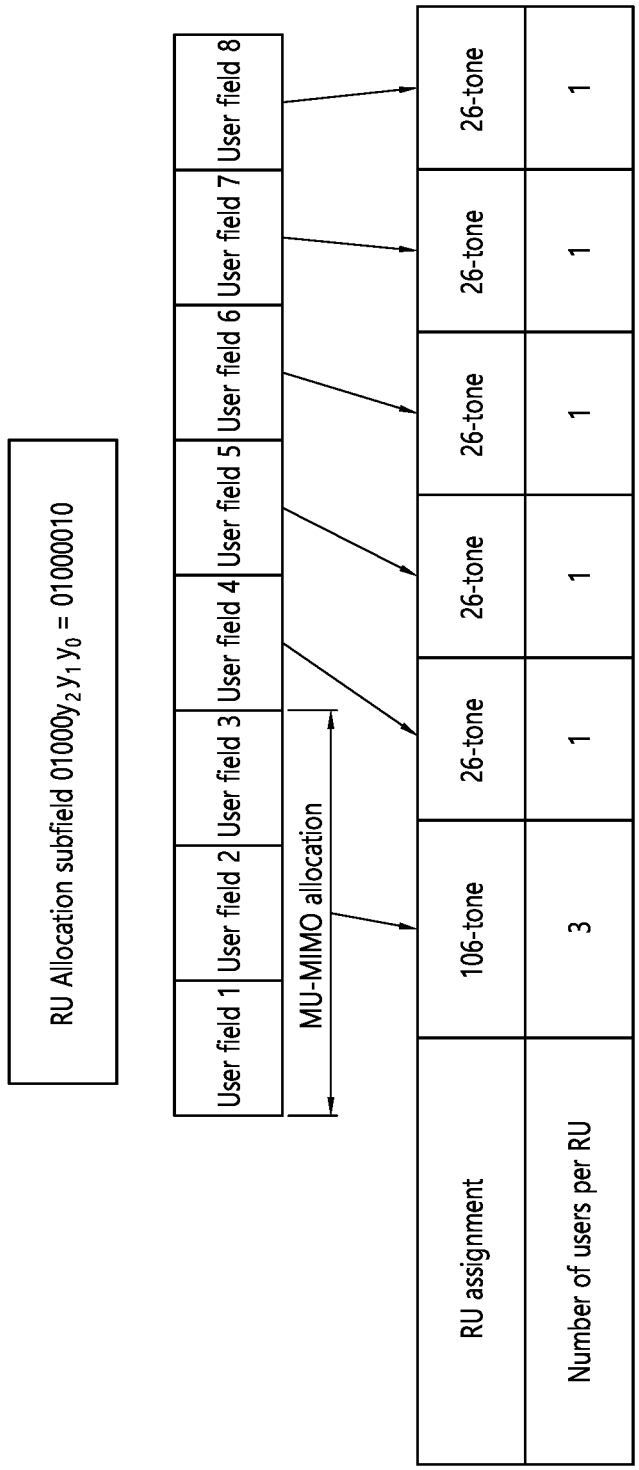
FIG. 9 illustrates an example in which a plurality of user STAs are allocated to the same RU through a MU-MIMO scheme.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 3 | 0000-0011 | 1-4 | 1 | 1 | | | | | | 3-6 | 13 |
| | 0100-0110 | 2-4 | 2 | 1 | | | | | | 5-7 | |
| | 0111-1000 | 3-4 | 3 | 1 | | | | | | 7-8 | |
| | 1001-1011 | 2-4 | 2 | 2 | | | | | | 6-8 | |
| | 1100 | 3 | 3 | 2 | | | | | | 8 | |
| 4 | 0000-0011 | 1-4 | 1 | 1 | 1 | | | | | 4-7 | 11 |
| | 0100-0110 | 2-4 | 2 | 1 | 1 | | | | | 6-8 | |
| | 0111 | 3 | 3 | 1 | 1 | | | | | 8 | |
| | 1000-1001 | 2-3 | 2 | 2 | 1 | | | | | 7-8 | |
| | 1010 | 2 | 2 | 2 | 2 | | | | | 8 | |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
| | 0100-0101 | 2-3 | 2 | 1 | 1 | 1 | | | | 7-8 | |
| | 0110 | 2 | 2 | 2 | 1 | 1 | | | | 8 | |
| 6 | 0000-0010 | 1-3 | 1 | 1 | 1 | 1 | 1 | | | 6-8 | 4 |
| | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPS K, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
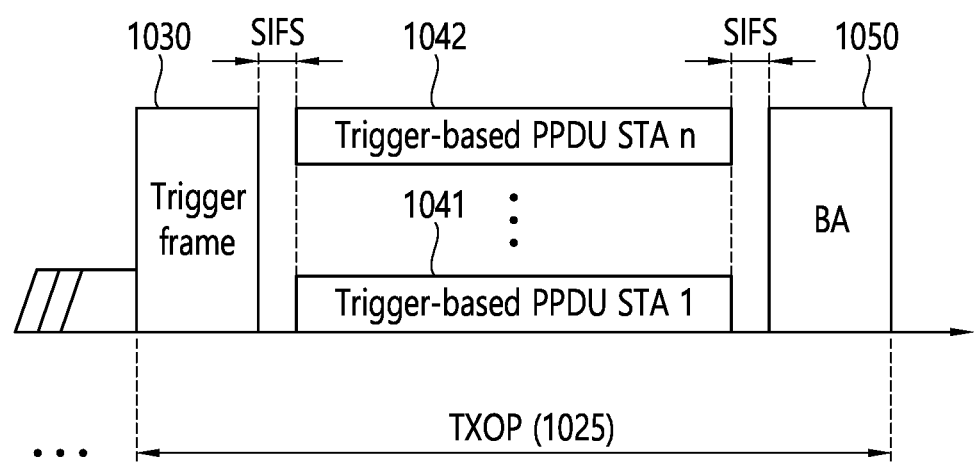
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
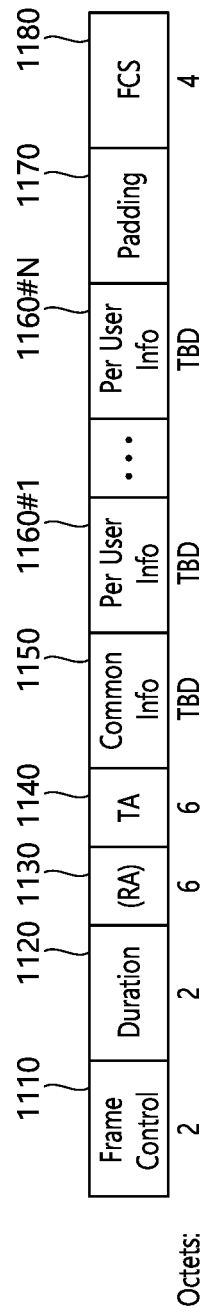
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
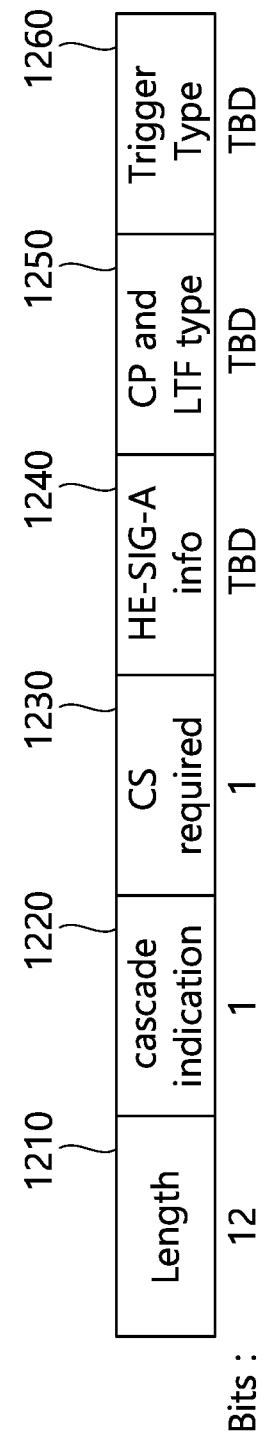
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
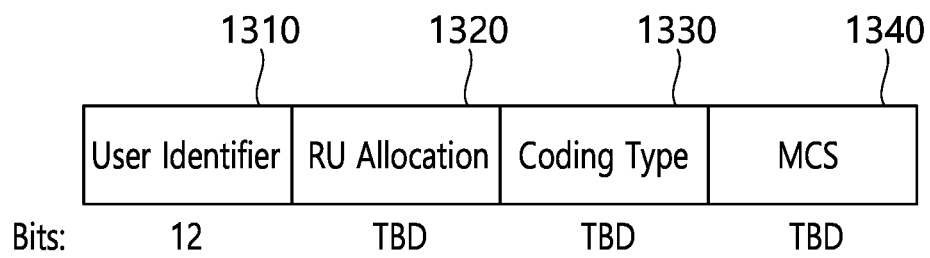
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
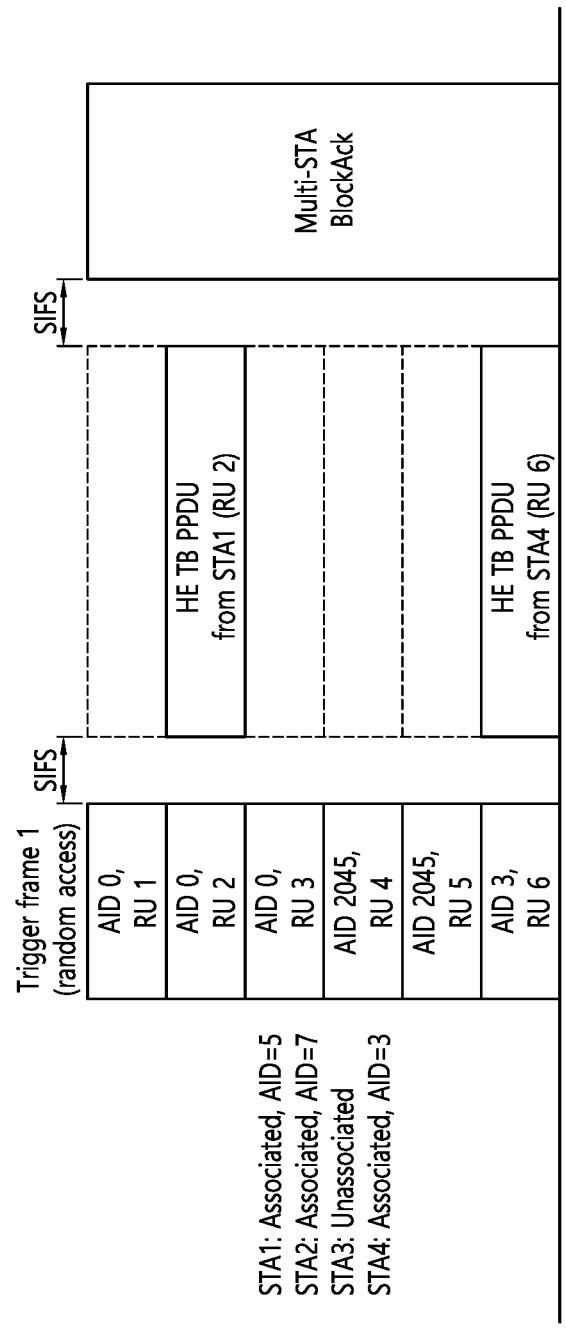
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
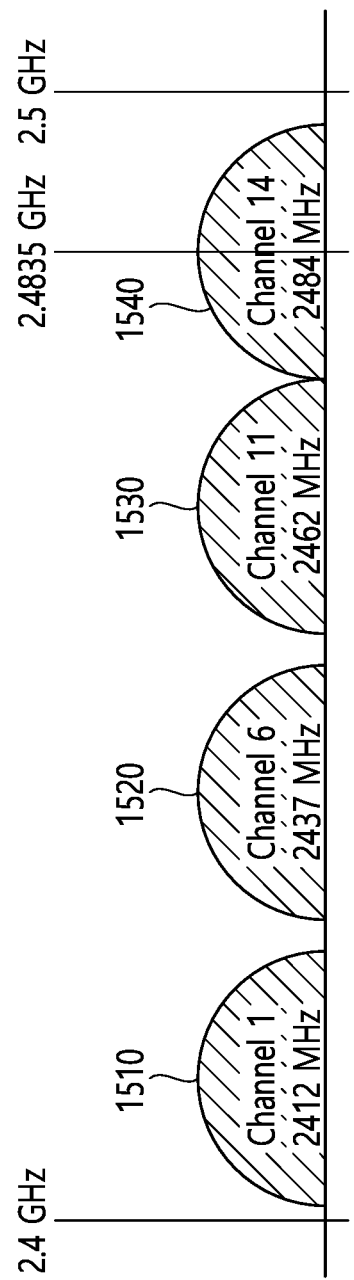
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462

MHz. The 4th frequency domain 1540 may include a channel 14. In this case, a center frequency of the channel 14 may be set to 2484 MHz.

Figure 16:
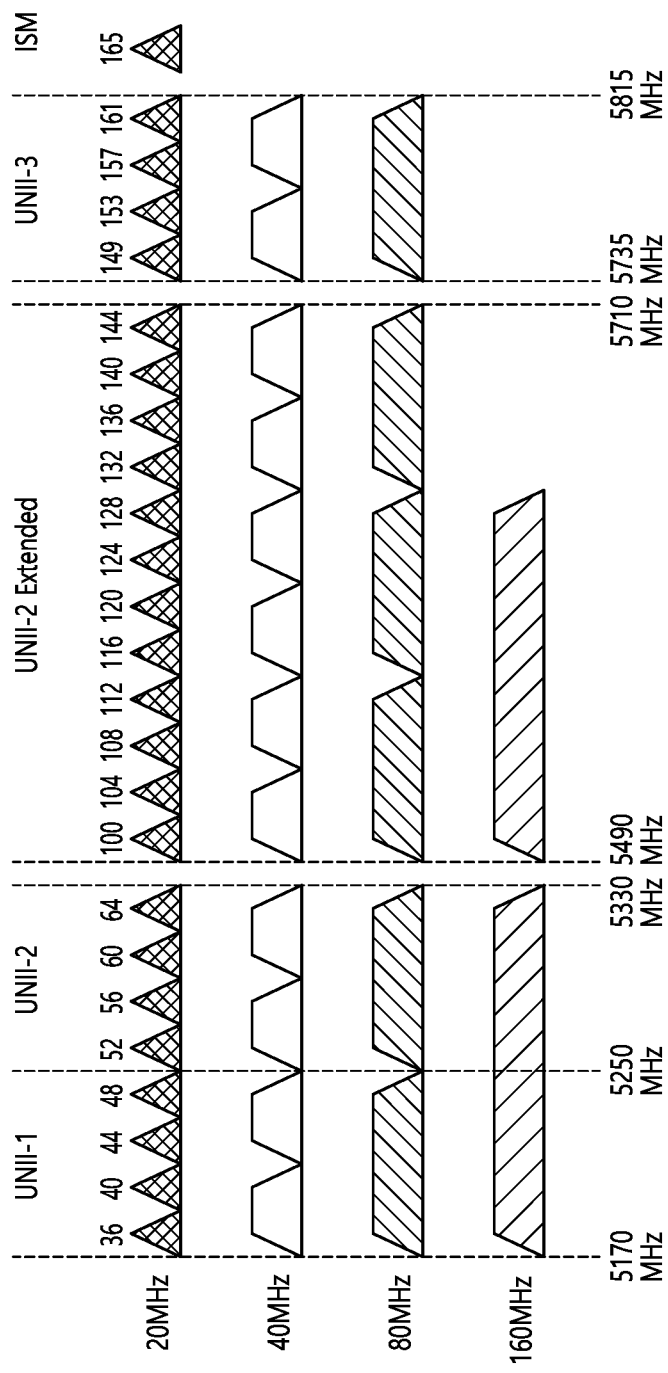
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
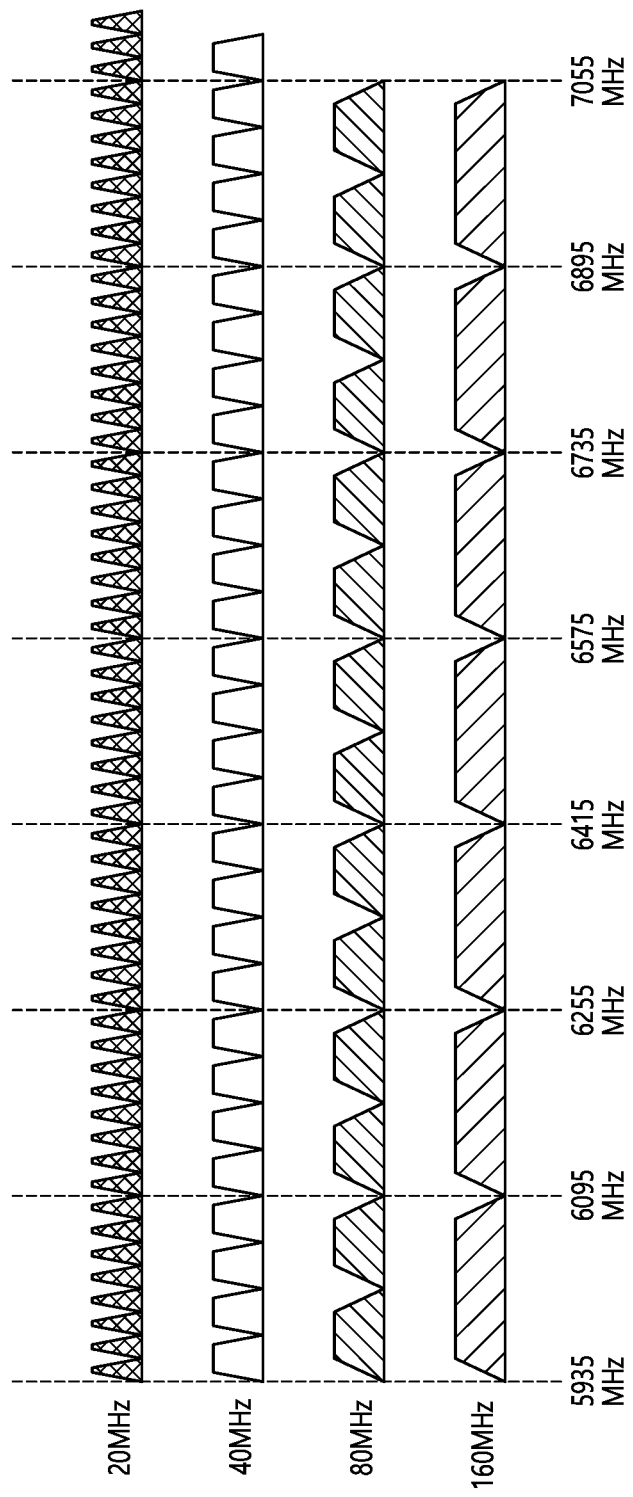
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 20 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
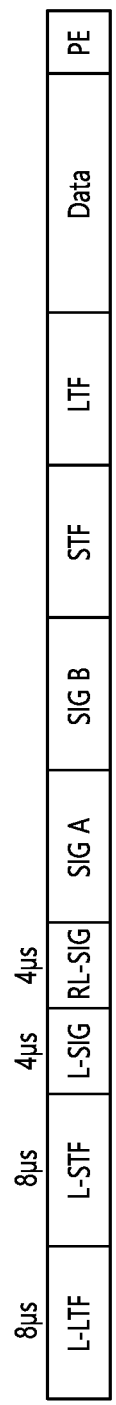
FIG. 18 illustrates an example of a PPDU used in the present specification.

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, an STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After the RL-SIG of FIG. 18, for example, EHT-SIG-A or one control symbol may be inserted. A symbol contiguous to the RL-SIG (i.e., EHT-SIG-A or one control symbol) may include 26-bit information and may further include information for identifying the type of the EHT PPDU. For example, when the EHT PPDU is classified into various types (e.g., an EHT PPDU supporting an SU mode, an EHT PPDU supporting a MU mode, an EHT PPDU related to the Trigger Frame, an EHT PPDU related to an Extended Range transmission, etc.), Information related to the type of the EHT PPDU may be included in a symbol contiguous to the RL-SIG.

A symbol contiguous to the RL-SIG may include, for example, information related to the length of the TXOP and information related to the BSS color ID. For example, the SIG-A field may be contiguous to the symbol contiguous to the RL-SIG (e.g., one control symbol). Alternatively, a symbol contiguous to the RL-SIG may be the SIG-A field.

For example, the SIG-A field may include 1) a DL/UL indicator, 2) a BSS color field which is an identifier of a BSS, 3) a field including information related to the remaining time of a current TXOP duration, 4) a bandwidth field including information related to the bandwidth, 5) a field including information related to an MCS scheme applied to an HE-SIG B, 6) a field including information related to whether a dual subcarrier modulation (DCM) scheme is applied to the HE-SIG B, 7) a field including information related to the number of symbols used for the HE-SIG B, 8) a field including information related to whether the HE-SIG B is generated over the entire band, 9) a field including information related to the type of the LTF/STF, 10) a field indicating the length of the HE-LTF and a CP length.

The SIG-B of FIG. 18 may include the technical features of HE-SIG-B shown in the example of FIGS. 8 to 9 as it is.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 μs, and a periodicity signal of 3.2 μs may be repeated 5 times to become a second type STF having a length of 16 μs. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 μs. In addition, Guard Intervals (GIs) with various lengths (e.g., 0.8/1/6/3.2 μs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may support various bandwidths. For example, the PPDU of FIG. 18 may have a bandwidth of 20/40/80/160/240/320 MHz. For example, at least one field (e.g., STF, LTF, data) of FIG. 18 may be configured based on RUs illustrated in FIGS. 5 to 7, and the like. For example, when there is one receiving STA of the PPDU of FIG. 18, all fields of the PPDU of FIG. 18 may occupy the entire bandwidth. For example, when there are multiple receiving STAs of the PPDU of FIG. 18 (i.e., when MU PPDU is used), some fields (e.g., STF, LTF, data) of FIG. 18 may be configured based on the RUs shown in FIGS. 5 to 7. For example, the STF, LTF, and data fields for the first receiving STA of the PPDU may be transmitted/received through a first RU, and the STF, LTF, and data fields for the second receiving STA of the PPDU may be transmitted/received through a second RU. In this case, the locations/positions of the first and second RUs may be determined based on FIGS. 5 to 7, and the like.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/ received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

1. Multi-Band (or Multi-Link) Aggregation

In order to increase a peak throughput, the 802.11be WLAN system is considering the transmission of increased streams by using a band that is wider than the legacy 802.11ax, or by using a larger number of antennas. Moreover, a method of using various bands/links by performing aggregation is also being considered.

Hereinafter, a "band" may include, for example, 2.4 GHz, 5 GHz, 6 GHz bands. For example, in the 11n standard, 2.4 GHz band and 5 GHz band were supported, and in the 11ax standard, up to 6 GHz band was supported. For example, multiple channels may be defined in a 5 GHz band.

In a WLAN system to which the technical characteristics of the present specification are applied, multi-band may be supported. That is, it may be possible for a transmitting STA to, for example, transmit a PPDU through any channel (e.g., 20/40/80/80+80/160 MHz, and so on) over a first band (e.g., 5 GHz) and, at the same time, to transmit a PPDU through any channel (e.g., 20/40/80/80+80/160/240/320 MHz, and so on) over a second band (e.g., 6 GHz). (In the present specification, a 240 MHz channel may be a contiguous 240 MHz channel or a combination of non-contiguous 80/160 MHz channels. Additionally, in the present specification, a 320 MHz channel may be a contiguous 320 MHz channel or a combination of non-contiguous 80/160 MHz channels. For example, in the present specification, a 240 MHz channel may mean a contiguous 240 MHz channel or an 80+80+80 MHz channel or an 80+160 MHz channel.)

Additionally, a multi-band that is described in the present specification may be interpreted to various meaning. For example, a transmitting STA may configure a first band as one channel among 20/40/80/80+80/160/240/320 MHz channels over a 6 GHz band, and may configure a second band as another channel among 20/40/80/80+80/160/240/320 MHz channels over the 6 GHz band, and, then, the transmitting STA may perform multi-band transmission (i.e., a transmission simultaneously supporting a first band and a second band). For example, a transmitting STA may simultaneously transmit a PPDU through a first band and a second band, or the transmitting STA may transmit a PPDU through only one of the bands at a specific time point.

At least any one of a Primary 20 MHz channel and a Secondary 20/40/80/160 MHz channel, which will be described later on in detail, may be transmitted through a first band and the remaining channel(s) may be transmitted through a second band. Alternatively, all channels may also be transmitted through a same band.

In the present specification, the term "band" may be replaced with the term "link".

2. Bandwidth Query Report (BQR) Operation

A non-AP STA may transmit a BQR in order to help (or aid) an access point (AP) to allocate DL MU and UL MU resources. The non-AP STA may implicitly deliver a BQR from a BQR Control subfield of a frame (unsolicited BQR) that is transmitted to the AP, or may respond to a Bandwidth Query Report Poll (BQRP) trigger frame (solicited BQR) so as to explicitly deliver a BQR from a frame that is transmitted to the AP.

The BQRP trigger frame is one type of trigger frame variant that is determined based on a Trigger Type subfield. In the BQRP trigger frame, a Trigger Dependent Common Info subfield and a Trigger Dependent User Info subfield do not exist.

Figure 19:
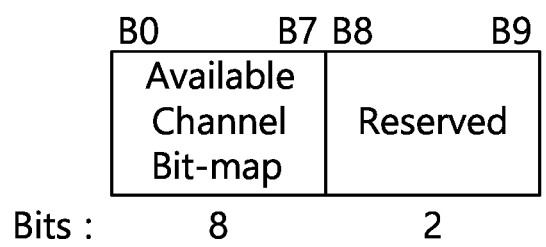
FIG. 19 is an example of a Control Information subfield format of a BQR Control subfield.

FIG. 19 is an example of a Control Information subfield format of a BQR Control subfield.

The Control Information subfield of the BQR Control subfield includes BQR information, which is used for performing a Bandwidth Query Report (BQR) operation for supporting the HE MU transmission.

Referring to FIG. 19, an Available Channel Bitmap subfield includes a bitmap, which indicates a subchannel that is available for usage by an STA that transmits the BQR. Each bit of the bitmap corresponds to a 20 MHz subchannel within an operating channel width of a BSS that is related to the STA, and an LSB corresponds to an operating subchannel of a lowest number. In the bitmap, a bit of position X is set to 1, which indicates that subchannel X+1 is in an idle state. Otherwise, the corresponding bit is set to 0 in order to indicate that the corresponding subchannel is busy or not available.

The availability of each 20 MHz subchannel is based on energy detection (ED)-based CCA (CCA sensitivity per 20 MHz), and, when a WM is in an idle state, the availability of each 20 MHz subchannel is reported for 20 MHz subchannels existing in an operating channel of the reporting STA.

When dot11HEBQRControlImplemented is true, a HE STA should set a BQR Support subfield of a transmitted HE Capabilities element to 1. Otherwise, the HE STA should set the BQR Support subfield to 0.

When the AP indicates support in the BQR Support subfield of the HE Capabilities element, the HE STA may report channel availability information (per 20 MHz CCA sensitivity) from the BQR Control subfield of the transmitted frame. Otherwise, the STA should not report the channel availability information from the BQR Control subfield.

The AP may request a BQR from the non-AP STA only when the AP has indicated support by setting the BQR Support field to 1 in the HE Capabilities element, which is transmitted by the non-AP STA. Otherwise, the AP should not require the BQR from the non-AP STA. The AP may request a BQR from one or more non-AP HE STA that supported BQR generation by transmitting a BQRP trigger frame.

A non-AP STA supporting BQR generation sends a response as defined below (solicited BQR).

An STA having received the BQRP trigger frame should generate a HE TB PPDU according to a rule that is defined for a non-AP STA operation for performing a UL MU operation, when an AID of the STA is included in a User Information field within the trigger frame. Otherwise, the STA should access a RA-RU according to a rule that is defined for UL OFDMA-based random access (UORA) and should generate a HE TB PPDU, when one or more RA-RUs is/are included in the trigger frame.

The STA should include one or more QoS null frames, each including a BQR Control subfield along with channel availability information of the STA, in the HE TB PPDU. The HE STA should not require immediate response to the frame(s) included in the HE TB PPDU. An Ack Policy Indication subfield of the frame should be set to "No Ack".

3. Embodiment(s) Applicable to the Present Specification

The present specification relates to a method for enhancing UL transmission performance of UEs performing a multiband operation (or multi-link operation) in a next generation WLAN system (802.11be, EHT) and, most particularly, to a method for enhancing performance in a UL MU transmission situation.

As mentioned above, the UE may transmit its available bandwidth information (in 20 MHz subchannel units) to the AP by using the BQR Control field. By using the information that is transmitted as described above, the AP may know which bandwidth is available for the UE. The AP may use the information on the available bandwidth so as to allocate idle UL resource to the UE. When a BQRP Trigger frame is received, if the allocated resource area is busy or has a NAV, the UE may not be capable of allocating UL resource to the corresponding UE. Since the AP does not have any BQR information related to the corresponding UE, the AP may not allocate UL resource to the corresponding UE, or may allocated UL resource to the corresponding UE without the BQR information. When UL resource is allocated to a busy area without BQR information, the UE cannot use the allocated resource, which may cause waste of resource.

When the UE is performing a multiband operation with capability, the UE may transmit BQR information (information indicating which subchannel is available) of one band (e.g., Band A) through another band (e.g., Band B), or may transmit BQR information of the entire band to another band (e.g., Band B). The UE may transmit BQR information by using a solicited method or an unsolicited method.

When the UE receives a BQR Trigger frame through Band B, information requesting BQR information through the corresponding band, to the corresponding UE, is included in the frame. However, if the BQR information fails to be transmitted through Band B due to the carrier sensing result of a channel (or allocated channel, Primary channel, allocated resource) of Band B being busy, when the UE transmits a UL frame (e.g., QoS data frame, QoS Null frame, HE TB PPDU, etc.) through Band A, the UE may transmit the UL frame after including the BQR information for Band B, or by including the BQR information for the entire band in the UL frame. When the UE receives the BQR Trigger frame through Band A, the UE may transmit the BQR information for Band B or the BQR information for the entire band by including the BQR information in a response frame. For example, information indicating the band(s) for which the BQR information is intended (e.g., Band index(es) or Band indication bitmap) and the respective BQR information (e.g., available channel bitmap) are included in the information transmitting a BQR (information indicating which subchannel is available) (e.g., HE/EHT variant BQR Control field) and, then, transmitted.

When the AP transmits a BQR Trigger frame to the UE having a multiband operation capability through one band (e.g., Band A), the BQR Trigger frame may request BQR information for another band (e.g., Band B) or may request BQR information for the entire band.

When the AP transmits a BQR Trigger frame to UEs having the multiband operation capability through Band B, if the AP fails to obtain BQR information from part of the UEs, the AP may transmit a BQR Trigger frame to the corresponding UEs through another band (e.g., Band A), so as to request BQR information of Band B, which is one band, or to request BQR information of the entire band. For example, information indicating which band(s) request(s) the BQR information (e.g., Band index(es) or Band indication bitmap) is included in a frame that triggers BQR (information indicating which subchannel is available) (e.g., BQR Trigger frame).

Figure 20:
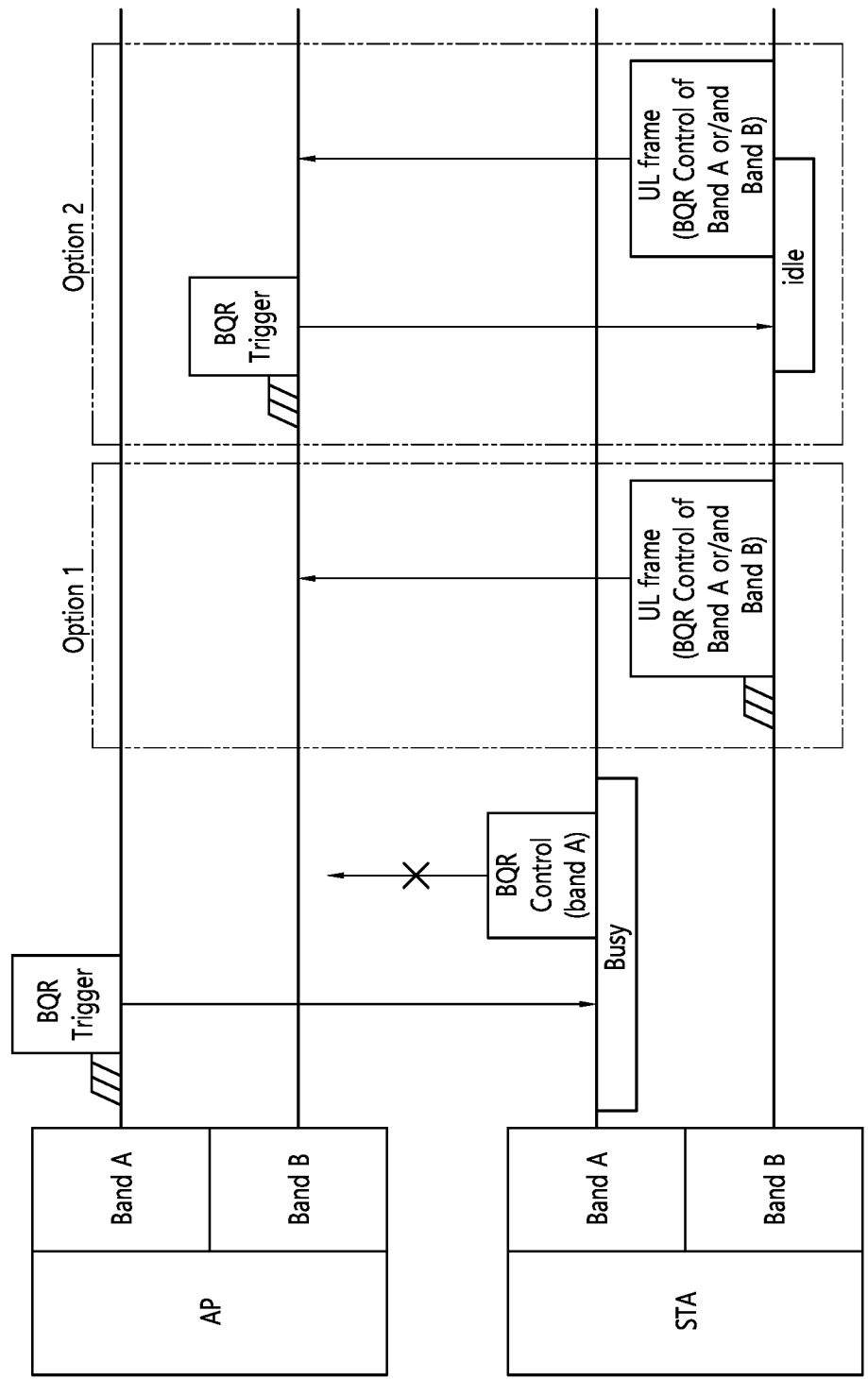
FIG. 20 shows a procedure for transmitting BQR information by a user equipment (UE) having a multiband operation capability.

FIG. 20 shows a procedure for transmitting BQR information by a user equipment (UE) having a multiband operation capability.

In FIG. 20, the AP and the STA operate in Band A and Band B, and the AP requests BQR information for Band A through Band A (S2010). Due to the Carrier Sensing result being busy, or due to the BQR Trigger Frame failing to be successfully received, the STA may not be capable of transmitting BQR Control information through Band A (S2020). In case the STA is not capable of transmitting BQR information due to the Carrier sensing result being busy, the STA transmits BQR information for Band A through Band B by using Option 1 (unsolicited method) or Option 2 (solicited method) (S2030, S2040). At this point, not only the BQR information for Band A, but also BQR information for another band or the entire band may be included and then transmitted. When using the solicited method, which is Option 2, in addition to the BQR information for the band that is indicated by the BQR Trigger frame, BQR information for another band or the entire band may be additionally included in the BQR Trigger frame and then transmitted. If the BQR Trigger frame fails to be appropriately received through Band A, the UE may be capable of transmitted the BQR information for Band A, through Band B, by using Option 2 (S2040).

In Option 1, a UL frame may be a QoS data frame, and, in Option 2, a UL frame may be a QoS Null frame.

Figure 21:
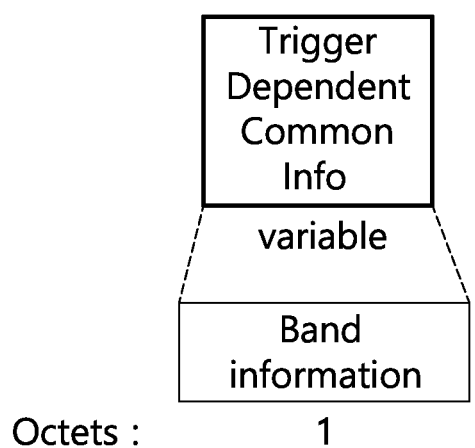
FIG. 21 shows an example of a Band Information subfield that is included in a trigger frame.

FIG. 21 shows an example of a Band Information subfield that is included in a trigger frame.

A Band Information subfield of FIG. 21 includes Multiband BQR information, and the Band Information subfield is included in a Trigger Dependent Common Info subfield of a trigger frame (for a Multiband BQR Trigger variant).

A structure of the Band Information subfield may indicate bands in a Bitmap format or index format, as described below.

1) Bitmap Method
-> Since the subfield is configured of an N-bit (e.g., 4-bit) bitmap, each bit corresponds to each band. Ex) Bit #0 for band 1 (e.g., 2.4 GHz), Bit #1 for band 2 (e.g., 5 GHz), Bit #2 for band 3 (e.g., 6 GHz), 2) Index Method
-> 0: band 1 (e.g., 2.4 GHz), 1: band 2 (e.g., 5 GHz), 2: band 3 (e.g., 6 GHz), N−1: band N, N: band 1+band 2, N+1: band 1+band 3, N+2: band 2+3, . . . +band 3, . . . .

FIG. 22 is an example representing a Band Information subfield in a bitmap format.

Referring to FIG. 22, Bit #0 represents 2.4 GHz, Bit #1 represents 5 GHz, and Bit #2 represents 6 GHz.

In the above-described example, a Multiband BQR Trigger variant frame is defined as a new type, and Band information is included in a Trigger Dependent Common Info subfield. The Band Information subfield may include band information indicating for which band the BQR is to be performed, in a bitmap format.

FIG. 22 is merely an example. And, therefore, band information may be delivered in other formats and structures. And, the term band may be differently expressed by using another word format (e.g., subband, link, and so on). For example, operation may be performed by using multiple subbands within a same band.

FIG. 23 is another example representing a Band Information subfield in a bitmap format.

In the example of FIG. 23, the AP manages 2 subbands (e.g., subband 1 and subband 2) at 5 GHz and 2 subbands (e.g., subband 1 and subband 2) at 6 GHz and manages 1 subband at 2.4 GHz.

It will be apparent that such example of using multiple subbands in one band may be equally applied in the bitmap method as well as in the index method. For example, in the index method, one index may indicate subband 1 of 5 GHz and subband 2 of 5 GHz, and another index may indicate subband 1 of 6 GHz and subband 2 of 6 GHz, and other values may indicate other combinations.

FIG. 24 shows an example of a HE variant Multiband BQR Control field that includes Multiband BQR information.

As information on the bands that indicate BQR information for which band is included in the Band information, the information may indicate band 1, band 2, . . . N. The information configuring the Band information may be configured as a bitmap, as shown in FIG. 24, so that each bit can indicate each band, or the information may be configured in an index format so as to indicate the bands.

1) Bitmap Method

-> Since the subfield is configured of an N-bit (e.g., 4-bit) bitmap, each bit corresponds to each band. Ex) Bit #0 for band 1 (e.g., 2.4 GHz), Bit #1 for band 2 (e.g., 5 GHz), Bit #2 for band 3 (e.g., 6 GHz), 2) Index Method -> 0: band 1 (e.g., 2.4 GHz), 1: band 2 (e.g., 5 GHz), 2: band 3 (e.g., 6 GHz), . . . N−1: band N, N: band 1+band 2, N+1: band 1+band 3, N+2: band 2+3, . . . .

The band indicated by the Bitmap method or the Index method may be 240 MHz, 320 MHz bands, and all combinations of the above-described bands may also be indicated by using the Bitmap method or the Index method.

The above-described method for configuring the Band Information subfield represents one example, and it will be apparent that the Band Information subfield may be modified or varied to a different format.

When using the unsolicited method (Option 1 of FIG. 20), the Band Information subfield of the Multiband BQR Control field of FIG. 24 may be configured to be the same as the Band Information subfield of the BQR trigger frame.

The Available Channel Bitmap for the bands being indicated by the Band Information may be located after the Band information.

Unlike as defined in the conventional system (11ax), the Available Channel Bitmap may be proposed as described below.

1) Bitmap Having a Fixed Size: Maximum Bandwidth Supported by the System

-> A Bitmap size may be defined based on size and CCA check unit.

A. If the Maximum bandwidth supported by one link is 320 MHz, and when CCA is checked in 20 MHz units, the Available Channel Bitmap has 16 bits per link/band.

B. If the Maximum bandwidth supported by one link is 240 MHz, and when CCA is checked in 20 MHz units, the Available Channel Bitmap has 12 bits per link/band.

C. If the Maximum bandwidth supported by one link is 160 MHz, and when CCA is checked in 20 MHz units, the Available Channel Bitmap has 8 bits per link/band.

D. When it is assumed that the CCA is checked in 40 MHz units, if the Maximum bandwidth is 320 MHz, the size of a bitmap has 8 bits, and each bit indicates a corresponding 40 MHz bandwidth.

2) Bitmap Having a Variable Size: Maximum Bandwidth Supported by Each Link

-> A Bitmap size of each link may be defined based on size and CCA check unit. For example, when two links exist, and when the supported bandwidth of the first link is 320 MHz and the supported bandwidth of the second link is 160 MHz, and if the CCA checked in 20 MHz units, the first Available Channel Bitmap is determined to have 16 bits, and the second Available Channel Bitmap is determined to have 8 bits.

The description presented above is merely an example. And, therefore, the bitmap may be varied to different formats.

Figure 25:
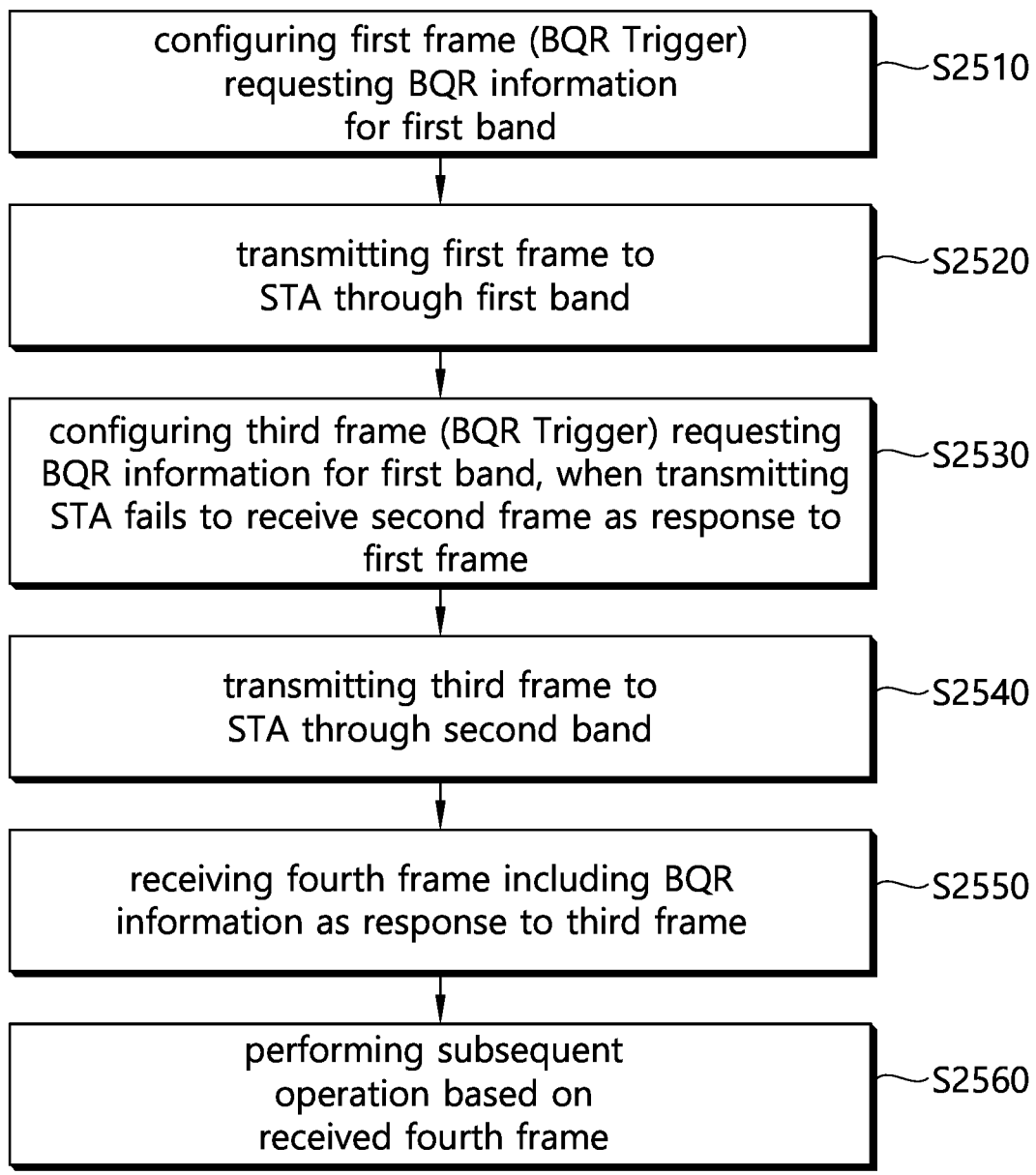
FIG. 25 is a procedure flowchart showing operations of a transmitting STA according to the present embodiment.

FIG. 25 is a procedure flowchart showing operations of a transmitting STA according to the present embodiment.

A transmitting STA (i.e., TX side STA or AP) of the present specification may be operated based on FIG. 25.

An example of FIG. 25 may be performed by the transmitting STA (AP). Since the process steps shown in the example of FIG. 25 are not mandatory process steps, some of the process steps may be skipped (or omitted), or the order of the illustrated process steps may be changed.

In step S2510, a transmitting STA configures a first frame (BQR Trigger frame) requesting BQR information for a first band.

In step S2520, the transmitting STA transmits the first frame to an STA through the first band.

In step S2530, when the transmitting STA fails to receive a second frame as a response to the first frame, the transmitting STA configures a third frame (BQR Trigger frame) requesting BQR information for the first band.

In step S2540, the transmitting STA transmits the third frame to the STA through a second band.

In step S2550, the transmitting STA receives a fourth frame including BQR information as a response to the third frame.

In step S2560, the transmitting STA performs a subsequent operation (UL MU transmission, and so on) based on the received fourth frame.

Figure 26:
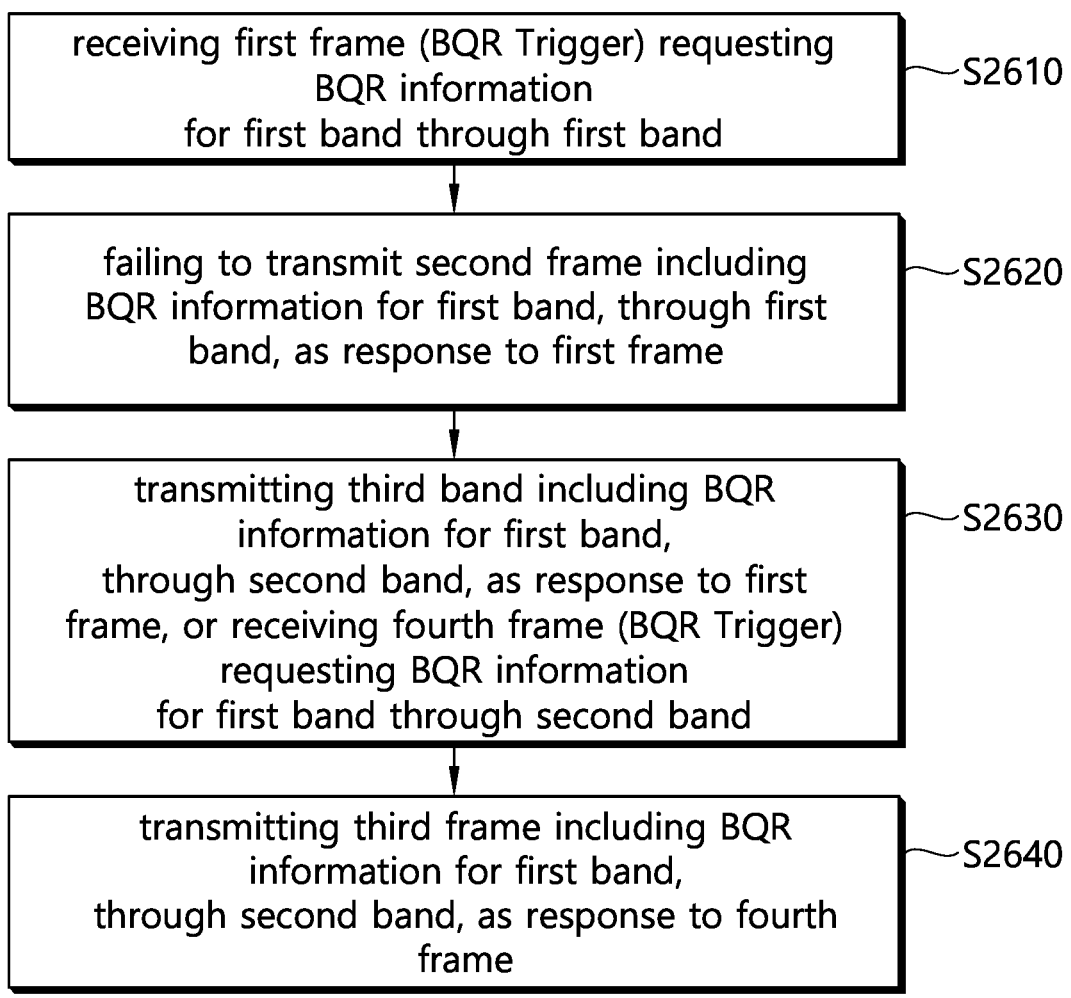
FIG. 26 is a procedure flowchart showing operations of a receiving STA according to the present embodiment.

FIG. 26 is a procedure flowchart showing operations of a receiving STA according to the present embodiment.

A receiving STA (i.e., RX side STA or non-AP STA) of the present specification may be operated based on FIG. 26.

An example of FIG. 26 may be performed by a receiving device (non-AP STA).

Since the process steps shown in the example of FIG. 26 are not mandatory process steps, some of the process steps may be skipped (or omitted), or the order of the illustrated process steps may be changed.

In step S2610, a receiving STA receives a first frame (BQR Trigger frame) requesting BQR information for a first band through the first band.

In step S2620, the receiving STA fails to transmit a second frame including BQR information for the first band, through the first band, as a response to the first frame.

In step S2630, the receiving STA transmits a third band including BQR information for the first band, through a second band, as a response to the first frame. Alternatively, the receiving STA receive a fourth frame (BQR Trigger frame) requesting BQR information for the first band through the second band.

In step S2640, the receiving STA transmits a third frame including BQR information for the first band, through the second band, as a response to the fourth frame (when the receiving STA has received the fourth frame in step S2630).

Hereinafter, the above-described embodiments will be described in more detail with reference to FIG. 1 to FIG. 19.

Figure 27:
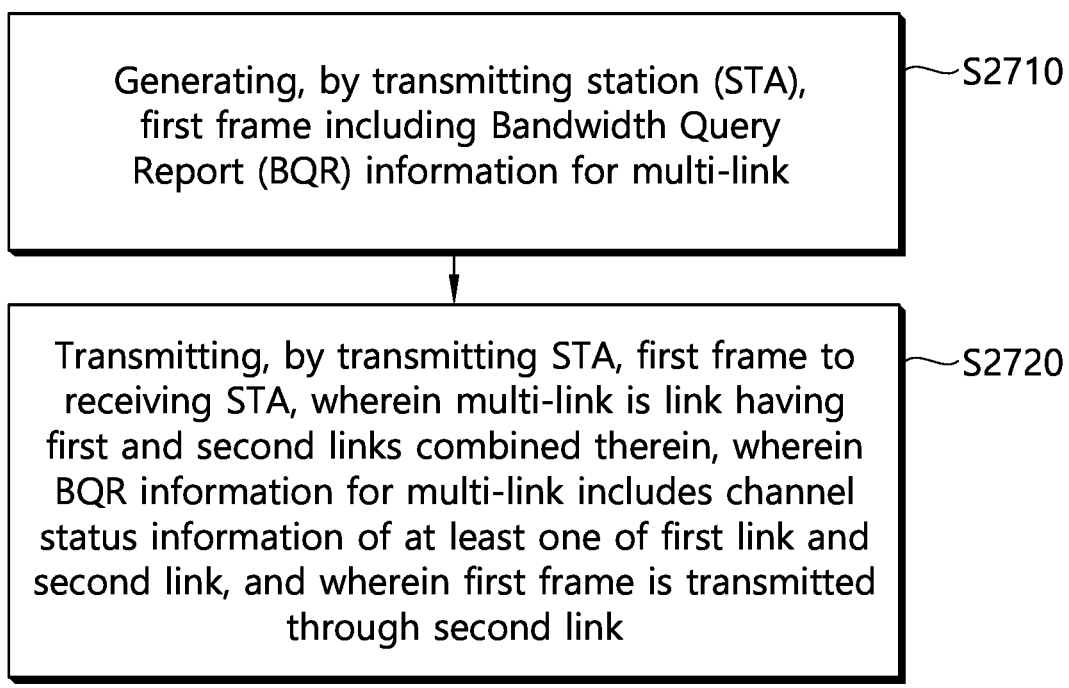
FIG. 27 is a flowchart showing a procedure for performing UL transmission through multi-link, by a transmitting STA, according to the present embodiment.

FIG. 27 is a flowchart showing a procedure for performing UL transmission through multi-link, by a transmitting STA, according to the present embodiment.

An example of FIG. 27 may be performed in a network environment in which a next generation WLAN system is being supported. The next generation wireless LAN system is a WLAN system that is enhanced from an 802.11ax system and may, therefore, satisfy backward compatibility with the 802.11ax system.

The next generation WLAN system may support Flexible DL/UL (FDU) technology. The FDU technology is a technology that enables a user equipment (UE) having two or more RFs to independently transmit/receive data in each RF. Since data being transmitted through a specific RF does not influence data being transmitted from another RF, the application of the FDU is advantageous in that a channel may be efficiently used.

The present embodiment is a method for performing UL transmission through a multi-link adopting the FDU technology. And, most particularly, the present embodiment proposes a method for efficiently performing UL MU transmission by transmitting BQR information.

The example of FIG. 27 is performed by a transmitting station (STA), and the transmitting STA may correspond to an STA supporting an Extremely High Throughput (EHT) system. A receiving STA of FIG. 27 may correspond to an access point (AP).

In step S2710, the transmitting STA generates a first frame including Bandwidth Query Report (BQR) information for a multi-link.

In step S2720, the transmitting STA transmits the first frame to a receiving STA.

The multi-link is a link having first and second links combined therein.

The BQR information for the multi-link includes channel status information of at least one of the first link and the second link. And, the first frame is transmitted through the second link.

That is, the BQR information for the multi-link may not only include channel status information for the second link through which the first frame is being transmitted but may also include channel status information for the first link (another link). Furthermore, the BQR information for the multi-link may only include the BQR information (channel status information) for the first link (another link), without the BQR information (channel status information) for the second link through which the first frame is being transmitted.

However, the transmitting STA may receive a BQR trigger frame (second frame) prior to transmitting the BQR information.

More specifically, the transmitting STA may receive a second frame from the receiving STA through the first link. The second frame may be a first BQR trigger frame requesting the BQR information for the multi-link. Since the second transmit requests BQR information for the first link, the second frame may be received in the first link.

After receiving the second frame, the transmitting STA may perform carrier sensing for the first link.

When a carrier sensing result for the first link is busy, the BQR information for the multi-link is not transmitted to the receiving STA through the first link. Alternatively, the transmitting STA may fail to successfully receive the second frame. Thus, the transmitting STA may not transmit the BQR information for the multi-link.

Additionally, the transmitting STA may transmit BQR information based on a solicited method, which uses a BQR trigger frame, or an unsolicited method, which does not use a BQR trigger frame.

According to the solicited method, the transmitting STA may receive a third frame from the receiving STA through the second link. The third frame may be a second BQR trigger frame requesting the BQR information for the multi-link. That is, the second BQR trigger frame may be a separate trigger frame requesting the BQR information for a multi-link through the second link. The first frame is transmitted as a response to the third frame.

According to the unsolicited method, the transmitting STA may transmit the BQR information for a multi-link without any separate trigger frame, such as the second BQR trigger frame.

The first frame may be a Quality of Service (QoS) data frame, a QoS null frame or a trigger-based Physical Protocol Data Unit (PPDU). In case of the unsolicited method, the first frame may be a QoS data frame. In case of the solicited method, the first frame may be a QoS null frame or a trigger-based PPDU.

The BQR information for a multi-link may be configured as described below.

The BQR information for the multi-link may include first and second subfields.

The first subfield may include information on a link through which the BQR information for the multi-link is to be transmitted. The second subfield may include information on a link that is available for usage by the transmitting STA or information on a subband within the corresponding link.

The link that is available for usage by the transmitting STA is determined based on the link through which the BQR information for the multi-link is to be transmitted. That is, the second subfield may be configured of information on a link that is available for usage for a link that is indicated by the first subfield or information on a subband within the corresponding link.

The link that is available for usage by the transmitting STA may include a 2.4 GHz band, a 5 GHz band or a 6 GHz band.

The subband within the link that is available for usage by the transmitting STA may include a 20 MHz band, a 40 MHz band, an 80 MHz band, a 160 MHz band, a 240 MHz band or a 320 MHz band. Additionally, a band that is configured of all combinations of the above-described band may also be included.

Information on the link through which the BQR information for the multi-link is to be transmitted may be indicated in a bitmap or index format. Each bit or each index of the bitmap may correspond to each link.

The BQR trigger frame may be configured as described below.

The second and third frame may include a Trigger Dependent Common Info subfield. The Trigger Dependent Common Info subfield may include a third subfield. The third subfield may include information on a link through which the BQR information for the multi-link is to be transmitted. And, information on the link through which the BQR information for the multi-link is to be transmitted may be indicated in a bitmap or index format.

That is, the third subfield being included in the second and third frame may be configured to be the same as the first subfield, which is included in the BQR information for the multi-link. Most particularly, in case of the unsolicited method, the BQR information for the multi-link needs the first subfield. In case of the solicited method, since the third subfield has already been transmitted, the first subfield is not mandatorily needed in the BQR information for the multi-link.

After the BQR information for the multi-link is to be transmitted, UL transmission through a multi-link is as described below.

The transmitting STA may receive allocation information for the multi-link from the receiving STA. And, the transmitting STA may transmit data through the multi-link based on the allocation information.

The allocation information for the multi-link may be determined based on the BQR information for the multi-link. A link that is to be allocated through the BQR information for the multi-link or a subband within the corresponding link may be determined, and the transmitting STA may transmit the data through the determined link or subband within the multi-link.

Figure 28:
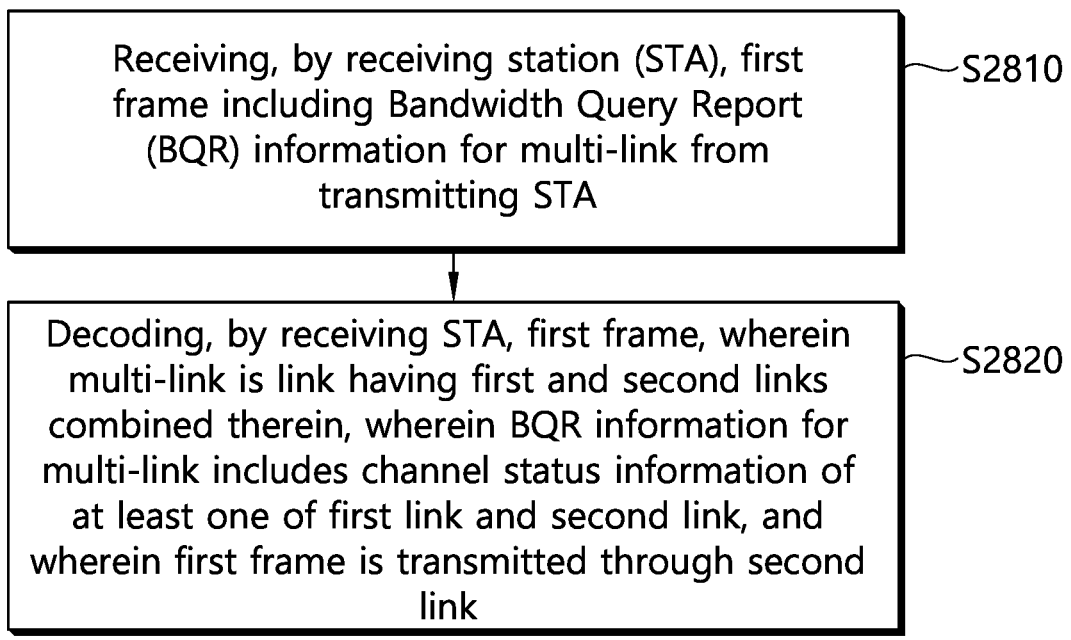
FIG. 28 is a flowchart showing a procedure for performing UL transmission through multi-link, by a receiving STA, according to the present embodiment.

FIG. 28 is a flowchart showing a procedure for performing UL transmission through multi-link, by a receiving STA, according to the present embodiment.

An example of FIG. 28 may be performed in a network environment in which a next generation WLAN system is being supported. The next generation wireless LAN system is a WLAN system that is enhanced from an 802.11ax system and may, therefore, satisfy backward compatibility with the 802.11ax system.

The next generation WLAN system may support Flexible DL/UL (FDU) technology. The FDU technology is a technology that enables a user equipment (UE) having two or more RFs to independently transmit/receive data in each RF. Since data being transmitted through a specific RF does not influence data being transmitted from another RF, the application of the FDU is advantageous in that a channel may be efficiently used.

The present embodiment is a method for performing UL transmission through a multi-link adopting the FDU technology. And, most particularly, the present embodiment proposes a method for efficiently performing UL MU transmission by transmitting BQR information.

The example of FIG. 28 is performed by a receiving station (STA) and may correspond to an access point (AP). The transmitting STA of FIG. 28 may correspond to an STA supporting an Extremely High Throughput (EHT) system.

In step S2810, a receiving STA receives a first frame including Bandwidth Query Report (BQR) information for a multi-link from a transmitting STA.

In step S2820, the receiving STA decodes the first frame.

The multi-link is a link having first and second links combined therein.

The BQR information for the multi-link includes channel status information of at least one of the first link and the second link. And, the first frame is transmitted through the second link.

That is, the BQR information for the multi-link may not only include channel status information for the second link through which the first frame is being transmitted but may also include channel status information for the first link (another link). Furthermore, the BQR information for the multi-link may only include the BQR information (channel status information) for the first link (another link), without the BQR information (channel status information) for the second link through which the first frame is being transmitted.

However, the transmitting STA may receive a BQR trigger frame (second frame) prior to transmitting the BQR information.

More specifically, the transmitting STA may receive a second frame from the receiving STA through the first link. The second frame may be a first BQR trigger frame requesting the BQR information for the multi-link. Since the second transmit requests BQR information for the first link, the second frame may be received in the first link.

After receiving the second frame, the transmitting STA may perform carrier sensing for the first link.

When a carrier sensing result for the first link is busy, the BQR information for the multi-link is not transmitted to the receiving STA through the first link. Alternatively, the transmitting STA may fail to successfully receive the second frame. Thus, the transmitting STA may not transmit the BQR information for the multi-link.

Additionally, the transmitting STA may transmit BQR information based on a solicited method, which uses a BQR trigger frame, or an unsolicited method, which does not use a BQR trigger frame.

According to the solicited method, the transmitting STA may receive a third frame from the receiving STA through the second link. The third frame may be a second BQR trigger frame requesting the BQR information for the multi-link. That is, the second BQR trigger frame may be a separate trigger frame requesting the BQR information for a multi-link through the second link. The first frame is transmitted as a response to the third frame.

According to the unsolicited method, the transmitting STA may transmit the BQR information for a multi-link without any separate trigger frame, such as the second BQR trigger frame.

The first frame may be a Quality of Service (QoS) data frame, a QoS null frame or a trigger-based Physical Protocol Data Unit (PPDU). In case of the unsolicited method, the first frame may be a QoS data frame. In case of the solicited method, the first frame may be a QoS null frame or a trigger-based PPDU.

The BQR information for a multi-link may be configured as described below.

The BQR information for the multi-link may include first and second subfields.

The first subfield may include information on a link through which the BQR information for the multi-link is to be transmitted. The second subfield may include information on a link that is available for usage by the transmitting STA or information on a subband within the corresponding link.

The link that is available for usage by the transmitting STA is determined based on the link through which the BQR information for the multi-link is to be transmitted. That is, the second subfield may be configured of information on a link that is available for usage for a link that is indicated by the first subfield or information on a subband within the corresponding link.

The link that is available for usage by the transmitting STA may include a 2.4 GHz band, a 5 GHz band or a 6 GHz band.

The subband within the link that is available for usage by the transmitting STA may include a 20 MHz band, a 40 MHz band, an 80 MHz band, a 160 MHz band, a 240 MHz band or a 320 MHz band. Additionally, a band that is configured of all combinations of the above-described band may also be included.

Information on the link through which the BQR information for the multi-link is to be transmitted may be indicated in a bitmap or index format. Each bit or each index of the bitmap may correspond to each link.

The BQR trigger frame may be configured as described below.

The second and third frame may include a Trigger Dependent Common Info subfield. The Trigger Dependent Common Info subfield may include a third subfield. The third subfield may include information on a link through which the BQR information for the multi-link is to be transmitted. And, information on the link through which the BQR information for the multi-link is to be transmitted may be indicated in a bitmap or index format.

That is, the third subfield being included in the second and third frame may be configured to be the same as the first subfield, which is included in the BQR information for the multi-link. Most particularly, in case of the unsolicited method, the BQR information for the multi-link needs the first subfield. In case of the solicited method, since the third subfield has already been transmitted, the first subfield is not mandatorily needed in the BQR information for the multi-link.

After the BQR information for the multi-link is to be transmitted, UL transmission through a multi-link is as described below.

The transmitting STA may receive allocation information for the multi-link from the receiving STA. And, the transmitting STA may transmit data through the multi-link based on the allocation information.

The allocation information for the multi-link may be determined based on the BQR information for the multi-link. A link that is to be allocated through the BQR information for the multi-link or a subband within the corresponding link may be determined, and the transmitting STA may transmit the data through the determined link or subband within the multi-link.

4. Device Configuration

Figure 29:
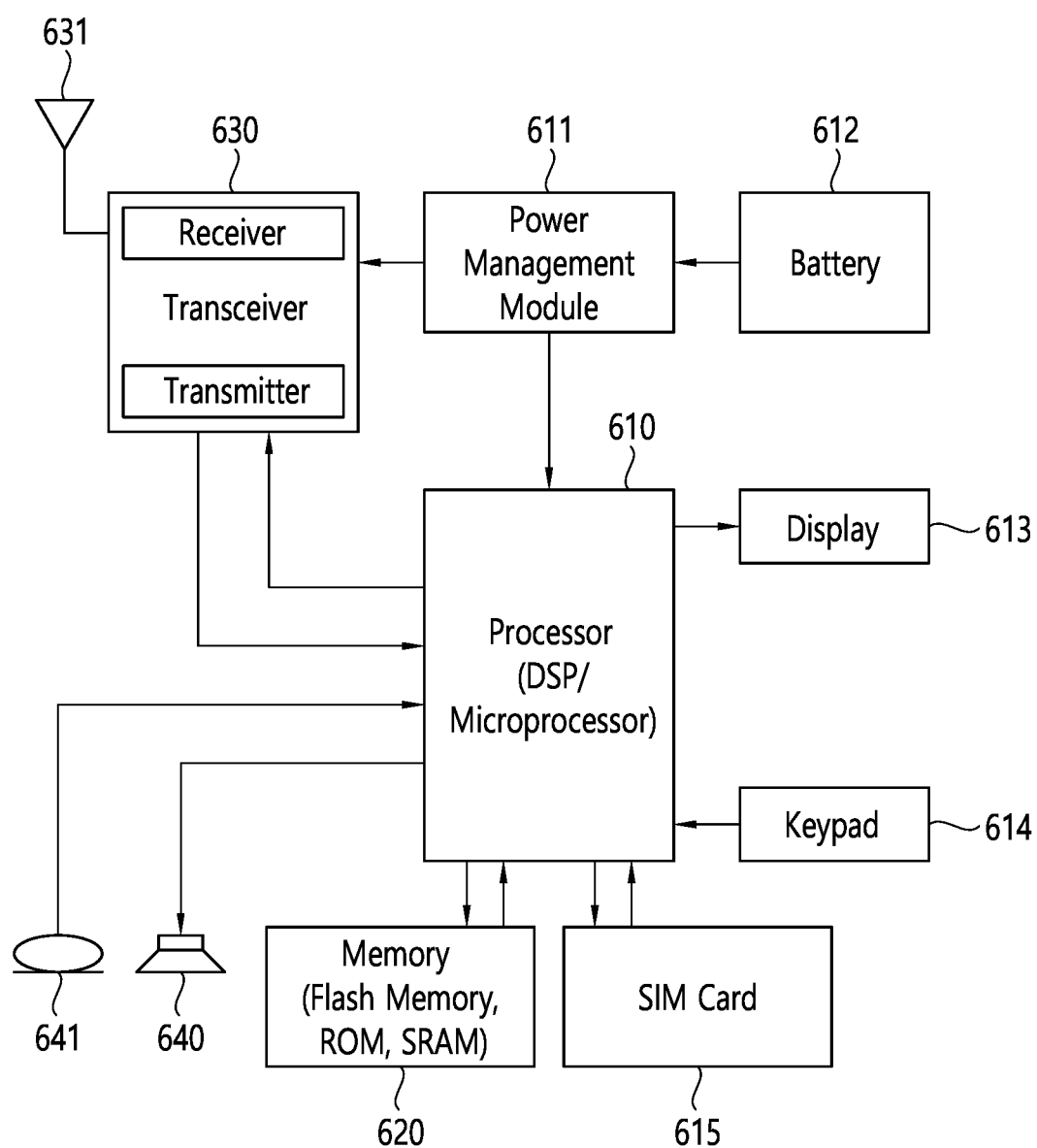
FIG. 29 illustrates modified examples of a transmitting device and/or receiving device of the present specification.

FIG. 29 illustrates modified examples of a transmitting device and/or receiving device of the present specification.

Each device/STA shown in sub-figures (a)/(b) of FIG. 1 may be modified as shown in FIG. 29. A transceiver 630 of FIG. 29 may be the same as the transceiver(s) 113 and 123 of FIG. 1. The transceiver 630 of FIG. 29 may include a receiver and a transmitter.

A processor 610 of FIG. 29 may be the same as the processor(s) 111 and 121 shown in FIG. 1. Alternatively, the processor 610 of FIG. 29 may be the same as the processing chip(s) 114 and 124 shown in FIG. 1.

A memory 150 of FIG. 29 may be the same as the memory(s) 112 and 122 shown in FIG. 1. Alternatively, the memory 150 of FIG. 29 may be a separate external memory that is different from the memory(s) 112 and 122 shown in FIG. 1.

Referring to FIG. 29, the power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 may be an integrated circuit that is intended to securely store the international mobile subscriber identity (IMSI) number and its related key, which are used to identify and authenticate subscribers on mobile telephony devices (such as mobile phones and computers).

Referring to FIG. 29, the speaker 640 may output sound-related results processed by the processor 610. The microphone 641 may receive sound-related inputs to be used by the processor 610.

The above-described technical features of the present specification may be applied to various device and methods. For example, the above-described technical features of the present specification may be performed/supported through FIG. 1 and/or FIG. 29. For example, the above-described technical features of the present specification may be applied to only part of FIG. 1 and/or FIG. 29. For example, the above-described technical features of the present specification may be implemented based on the processing chip(s) 114 and 124 of FIG. 1, or implemented based on the processor(s) 111 and 121 and the memory(s) 112 and 122, or implemented based on the processor 610 and the memory 620 of FIG. 29. For example, the device of the present specification is a device performing UL transmission in a multi-link, and the device includes a memory, and a processor being operatively connected to the memory, wherein the processor is configured to generate a first frame including Bandwidth Query Report (BQR) information for a multi-link, and to transmit the first frame to a receiving STA.

The multi-link is a link having first and second links combined therein.

The BQR information for the multi-link includes channel status information of at least one of the first link and the second link. And, the first frame is transmitted through the second link.

That is, the BQR information for the multi-link may not only include channel status information for the second link through which the first frame is being transmitted but may also include channel status information for the first link (another link). Furthermore, the BQR information for the multi-link may only include the BQR information (channel status information) for the first link (another link), without the BQR information (channel status information) for the second link through which the first frame is being transmitted.

However, the transmitting STA may receive a BQR trigger frame (second frame) prior to transmitting the BQR information.

More specifically, the transmitting STA may receive a second frame from the receiving STA through the first link. The second frame may be a first BQR trigger frame requesting the BQR information for the multi-link. Since the second transmit requests BQR information for the first link, the second frame may be received in the first link.

After receiving the second frame, the transmitting STA may perform carrier sensing for the first link.

When a carrier sensing result for the first link is busy, the BQR information for the multi-link is not transmitted to the receiving STA through the first link. Alternatively, the transmitting STA may fail to successfully receive the second frame. Thus, the transmitting STA may not transmit the BQR information for the multi-link.

Additionally, the transmitting STA may transmit BQR information based on a solicited method, which uses a BQR trigger frame, or an unsolicited method, which does not use a BQR trigger frame.

According to the solicited method, the transmitting STA may receive a third frame from the receiving STA through the second link. The third frame may be a second BQR trigger frame requesting the BQR information for the multi-link. That is, the second BQR trigger frame may be a separate trigger frame requesting the BQR information for a multi-link through the second link. The first frame is transmitted as a response to the third frame.

According to the unsolicited method, the transmitting STA may transmit the BQR information for a multi-link without any separate trigger frame, such as the second BQR trigger frame.

The first frame may be a Quality of Service (QoS) data frame, a QoS null frame or a trigger-based Physical Protocol Data Unit (PPDU). In case of the unsolicited method, the first frame may be a QoS data frame. In case of the solicited method, the first frame may be a QoS null frame or a trigger-based PPDU.

The BQR information for a multi-link may be configured as described below.

The BQR information for the multi-link may include first and second subfields.

The first subfield may include information on a link through which the BQR information for the multi-link is to be transmitted. The second subfield may include information on a link that is available for usage by the transmitting STA or information on a subband within the corresponding link.

The link that is available for usage by the transmitting STA is determined based on the link through which the BQR information for the multi-link is to be transmitted. That is, the second subfield may be configured of information on a link that is available for usage for a link that is indicated by the first subfield or information on a subband within the corresponding link.

The link that is available for usage by the transmitting STA may include a 2.4 GHz band, a 5 GHz band or a 6 GHz band.

The subband within the link that is available for usage by the transmitting STA may include a 20 MHz band, a 40 MHz band, an 80 MHz band, a 160 MHz band, a 240 MHz band or a 320 MHz band. Additionally, a band that is configured of all combinations of the above-described band may also be included.

Information on the link through which the BQR information for the multi-link is to be transmitted may be indicated in a bitmap or index format. Each bit or each index of the bitmap may correspond to each link.

The BQR trigger frame may be configured as described below.

The second and third frame may include a Trigger Dependent Common Info subfield. The Trigger Dependent Common Info subfield may include a third subfield. The third subfield may include information on a link through which the BQR information for the multi-link is to be transmitted. And, information on the link through which the BQR information for the multi-link is to be transmitted may be indicated in a bitmap or index format.

That is, the third subfield being included in the second and third frame may be configured to be the same as the first subfield, which is included in the BQR information for the multi-link. Most particularly, in case of the unsolicited method, the BQR information for the multi-link needs the first subfield. In case of the solicited method, since the third subfield has already been transmitted, the first subfield is not mandatorily needed in the BQR information for the multi-link.

After the BQR information for the multi-link is to be transmitted, UL transmission through a multi-link is as described below.

The transmitting STA may receive allocation information for the multi-link from the receiving STA. And, the transmitting STA may transmit data through the multi-link based on the allocation information.

The allocation information for the multi-link may be determined based on the BQR information for the multi-link. A link that is to be allocated through the BQR information for the multi-link or a subband within the corresponding link may be determined, and the transmitting STA may transmit the data through the determined link or subband within the multi-link.

The technical features of the present specification may be implemented based on a computer readable medium (CRM). For example, the CRM that is proposed in the present specification is a computer readable medium including an instruction being executed by at least one processor.

The CRM may store instructions performing operations including the steps of generating a first frame including Bandwidth Query Report (BQR) information for a multi-link, and transmitting, by the transmitting STA, the first frame to a receiving STA. The instructions that are stored in the CRM of the present specification may be executed by at least one processor. At least one processor being related to the CRM of the present specification may be the processor(s) 111 and 121 or processing chip(s) 114 and 124 of FIG. 1, or the processor 610 of FIG. 29. Meanwhile, the CRM of the present specification may be the memory(s) 112 and 122 of FIG. 1, or the memory 620 of FIG. 29, or a separate external memory/storage medium/disc, and so on.

The multi-link is a link having first and second links combined therein.

The BQR information for the multi-link includes channel status information of at least one of the first link and the second link. And, the first frame is transmitted through the second link.

That is, the BQR information for the multi-link may not only include channel status information for the second link through which the first frame is being transmitted but may also include channel status information for the first link (another link). Furthermore, the BQR information for the multi-link may only include the BQR information (channel status information) for the first link (another link), without the BQR information (channel status information) for the second link through which the first frame is being transmitted.

However, the transmitting STA may receive a BQR trigger frame (second frame) prior to transmitting the BQR information.

More specifically, the transmitting STA may receive a second frame from the receiving STA through the first link. The second frame may be a first BQR trigger frame requesting the BQR information for the multi-link. Since the second transmit requests BQR information for the first link, the second frame may be received in the first link.

After receiving the second frame, the transmitting STA may perform carrier sensing for the first link.

When a carrier sensing result for the first link is busy, the BQR information for the multi-link is not transmitted to the receiving STA through the first link. Alternatively, the transmitting STA may fail to successfully receive the second frame. Thus, the transmitting STA may not transmit the BQR information for the multi-link.

Additionally, the transmitting STA may transmit BQR information based on a solicited method, which uses a BQR trigger frame, or an unsolicited method, which does not use a BQR trigger frame.

According to the solicited method, the transmitting STA may receive a third frame from the receiving STA through the second link. The third frame may be a second BQR trigger frame requesting the BQR information for the multi-link. That is, the second BQR trigger frame may be a separate trigger frame requesting the BQR information for a multi-link through the second link. The first frame is transmitted as a response to the third frame.

According to the unsolicited method, the transmitting STA may transmit the BQR information for a multi-link without any separate trigger frame, such as the second BQR trigger frame.

The first frame may be a Quality of Service (QoS) data frame, a QoS null frame or a trigger-based Physical Protocol Data Unit (PPDU). In case of the unsolicited method, the first frame may be a QoS data frame. In case of the solicited method, the first frame may be a QoS null frame or a trigger-based PPDU.

The BQR information for a multi-link may be configured as described below.

The BQR information for the multi-link may include first and second subfields.

The first subfield may include information on a link through which the BQR information for the multi-link is to be transmitted. The second subfield may include information on a link that is available for usage by the transmitting STA or information on a subband within the corresponding link.

The link that is available for usage by the transmitting STA is determined based on the link through which the BQR information for the multi-link is to be transmitted. That is, the second subfield may be configured of information on a link that is available for usage for a link that is indicated by the first subfield or information on a subband within the corresponding link.

The link that is available for usage by the transmitting STA may include a 2.4 GHz band, a 5 GHz band or a 6 GHz band.

The subband within the link that is available for usage by the transmitting STA may include a 20 MHz band, a 40 MHz band, an 80 MHz band, a 160 MHz band, a 240 MHz band or a 320 MHz band. Additionally, a band that is configured of all combinations of the above-described band may also be included.

Information on the link through which the BQR information for the multi-link is to be transmitted may be indicated in a bitmap or index format. Each bit or each index of the bitmap may correspond to each link.

The BQR trigger frame may be configured as described below.

The second and third frame may include a Trigger Dependent Common Info subfield. The Trigger Dependent Common Info subfield may include a third subfield. The third subfield may include information on a link through which the BQR information for the multi-link is to be transmitted. And, information on the link through which the BQR information for the multi-link is to be transmitted may be indicated in a bitmap or index format.

That is, the third subfield being included in the second and third frame may be configured to be the same as the first subfield, which is included in the BQR information for the multi-link. Most particularly, in case of the unsolicited method, the BQR information for the multi-link needs the first subfield. In case of the solicited method, since the third subfield has already been transmitted, the first subfield is not mandatorily needed in the BQR information for the multi-link.

After the BQR information for the multi-link is to be transmitted, UL transmission through a multi-link is as described below.

The transmitting STA may receive allocation information for the multi-link from the receiving STA. And, the transmitting STA may transmit data through the multi-link based on the allocation information.

The allocation information for the multi-link may be determined based on the BQR information for the multi-link. A link that is to be allocated through the BQR information for the multi-link or a subband within the corresponding link may be determined, and the transmitting STA may transmit the data through the determined link or subband within the multi-link.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claim of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
    receiving, by a transmitting station (STA) having a capability for a multi-link, a first Bandwidth Query Report (BQR) trigger frame requesting BQR information for the multi-link from a receiving STA through a first link;
    generating, by the transmitting STA, the BQR information for the multi-link; and
    transmitting, by the transmitting STA, the BQR information for the multi-link to the receiving STA through a second link,
    wherein the multi-link is a link having the first and second links combined therein,
    wherein the first BQR trigger frame includes first link information on links through which the BQR information for the multi-link is to be transmitted,
    wherein the BQR information for the multi-link includes second link information and an available channel bitmap for links indicated by the second link information,
    wherein the second link information includes information on links that indicate BQR information for which link is included in the first link information,
    wherein a size of the available channel bitmap is defined based on a size of a maximum bandwidth and a unit for checking clear channel assessment (CCA),
    wherein based on the size of the maximum bandwidth supported by one link being 320 MHz and the CCA is checked in units of 20 MHz, the size of the available channel bitmap is 16 bits per link, and each bit of the available channel bitmap includes channel status information for a corresponding 20 MHz bandwidth of the links indicated by the second link information,
    wherein based on the size of the maximum bandwidth supported by one link being 240 MHz and the CCA is checked in units of 20 MHz, the size of the available channel bitmap is 12 bits per link, and each bit of the available channel bitmap includes channel status information for a corresponding 20 MHz bandwidth of the links indicated by the second link information,
    wherein based on the size of the maximum bandwidth supported by one link being 160 MHz and the CCA is checked in units of 20 MHz, the size of the available channel bitmap is 8 bits per link, and each bit of the available channel bitmap includes channel status information for a corresponding 20 MHz bandwidth of the links indicated by the second link information, and
    wherein based on the size of the maximum bandwidth supported by one link being 320 MHz and the CCA is checked in units of 40 MHz, the size of the available channel bitmap is 8 bits per link, and each bit of the available channel bitmap includes channel status information for a corresponding 40 MHz bandwidth of the links indicated by the second link information.

2. The method of claim 1, further comprising:
    performing, by the transmitting STA, carrier sensing for the first link, after receiving the first BQR trigger frame,
    wherein, based on a carrier sensing result for the first link being busy, the BQR information for the multi-link is not transmitted to the receiving STA through the first link.

3. The method of claim 2, wherein the BQR information for the multi-link-is a Quality of Service (QOS) data frame, a QoS null frame or a trigger-based Physical Protocol Data Unit (PPDU).

4. The method of claim 1, wherein the BQR information for the multi-link further includes
    information on a link that is available for usage by the transmitting STA or information on a subband within the corresponding link, wherein the link that is available for usage by the transmitting STA is determined based on the link through which the BQR information for the multi-link is to be transmitted, wherein the link that is available for usage by the transmitting STA includes a 2.4 GHz band, a 5 GHz band or a 6 GHz band, and wherein the subband within the link that is available for usage by the transmitting STA includes a 20 MHz band, a 40 MHz band, an 80 MHz band, a 160 MHz band, a 240 MHz band or a 320 MHz band.

5. The method of claim 4, wherein information on the link through which the BQR information for the multi-link is to be transmitted is indicated in a bitmap or index format.

6. The method of claim 1, wherein the first BQR trigger frame includes a Trigger Dependent Common Info subfield, wherein the Trigger Dependent Common Info subfield includes the first link information, wherein the first link information is indicated in a bitmap or index format.

7. The method of claim 1, further comprising:

receiving, by the transmitting STA, allocation information for the multi-link from the receiving STA; and transmitting, by the transmitting STA, data through the multi-link based on the allocation information, wherein the allocation information for the multi-link is determined based on the BQR information for the multi-link, and wherein the multi-link is a link in which the first and second links operate independently.

8. A transmitting station (STA) having a capability for a multi-link in a wireless local area network (WLAN) system, the transmitting STA comprising:

a memory;

a transceiver; and a processor being operatively connected to the memory and the transceiver, wherein the processor is configured to:

receive a first Bandwidth Query Report (BQR) trigger frame requesting BQR information for the multi-link from a receiving STA through a first link;

generate the BQR information for the multi-link; and transmit the BQR information for the multi-link to the receiving STA through a second link, wherein the multi-link is a link having first and second links combined therein, wherein the first BQR trigger frame includes first link information on links through which the BQR information for the multi-link is to be transmitted, wherein the BQR information for the multi-link includes second link information and an available channel bitmap for links indicated by the second link information, wherein the second link information includes information on links that indicate BQR information for which link is included in the first link information, wherein a size of the available channel bitmap is defined based on a size of a maximum bandwidth and a unit for checking clear channel assessment (CCA), wherein based on the size of the maximum bandwidth supported by one link being 320 MHz and the CCA is checked in units of 20 MHz, the size of the available channel bitmap is 16 bits per link, and each bit of the available channel bitmap includes channel status information for a corresponding 20 MHz bandwidth of the links indicated by the second link information, wherein based on the size of the maximum bandwidth supported by one link being 240 MHz and the CCA is checked in units of 20 MHz, the size of the available channel bitmap is 12 bits per link, and each bit of the available channel bitmap includes channel status information for a corresponding 20 MHz bandwidth of the links indicated by the second link information, wherein based on the size of the maximum bandwidth supported by one link being 160 MHz and the CCA is checked in units of 20 MHz, the size of the available channel bitmap is 8 bits per link, and each bit of the available channel bitmap includes channel status information for a corresponding 20 MHz bandwidth of the links indicated by the second link information, and wherein based on the size of the maximum bandwidth supported by one link being 320 MHz and the CCA is checked in units of 40 MHZ, the size of the available channel bitmap is 8 bits per link, and each bit of the available channel bitmap includes channel status information for a corresponding 40 MHz bandwidth of the links indicated by the second link information.

9. The transmitting STA of claim 8, wherein the processor:

performs carrier sensing for the first link, after receiving the first BQR trigger frame, wherein, based on a carrier sensing result for the first link being busy, the BQR information for the multi-link is not transmitted to the receiving STA through the first link.

10. A method in a wireless local area network (WLAN) system, the method comprising:

transmitting, by a receiving station (STA), a first Bandwidth Query Report (BQR) trigger frame requesting BQR information for a multi-link from a transmitting STA having a capability for the multi-link through a first link;

receiving, by a receiving station (STA), the BQR information for the multi-link from the transmitting STA; and decoding, by the receiving STA, the BQR information for the multi-link, wherein the multi-link is a link having first and second links combined therein, wherein the first BQR trigger frame includes first link information on links through which the BQR information for the multi-link is to be transmitted, wherein the BQR information for the multi-link includes second link information and an available channel bitmap for links indicated by the second link information, wherein the second link information includes information on links that indicate BQR information for which link is included in the first link information, wherein a size of the available channel bitmap is defined based on a size of a maximum bandwidth and a unit for checking clear channel assessment (CCA), wherein based on the size of the maximum bandwidth supported by one link being 320 MHz and the CCA is checked in units of 20 MHz, the size of the available channel bitmap is 16 bits per link, and each bit of the available channel bitmap includes channel status information for a corresponding 20 MHz bandwidth of the links indicated by the second link information, wherein based on the size of the maximum bandwidth supported by one link being 240 MHz and the CCA is checked in units of 20 MHz, the size of the available channel bitmap is 12 bits per link, and each bit of the available channel bitmap includes channel status information for a corresponding 20 MHz bandwidth of the links indicated by the second link information, wherein based on the size of the maximum bandwidth supported by one link being 160 MHz and the CCA is checked in units of 20 MHZ, the size of the available channel bitmap is 8 bits per link, and each bit of the available channel bitmap includes channel status information for a corresponding 20 MHz bandwidth of the links indicated by the second link information, and wherein based on the size of the maximum bandwidth supported by one link being 320 MHz and the CCA is checked in units of 40 MHZ, the size of the available channel bitmap is 8 bits per link, and each bit of the available channel bitmap includes channel status information for a corresponding 40 MHz bandwidth of the links indicated by the second link information.

11. The method of claim 10, wherein, based on a carrier sensing result for the first link being busy, the BQR information for the multi-link is not transmitted to the receiving STA through the first link.

* * * * *